(12) United States Patent
Nagaya et al.

(10) Patent No.: US 6,939,090 B1
(45) Date of Patent: Sep. 6, 2005

(54) THROWAWAY TIP AND THROWAWAY-TYPE CUTTING TOOL

(75) Inventors: Hidehiko Nagaya, Yuuki-gun (JP); Hiroshi Shimomura, Yuuki-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/639,946

(22) Filed: Aug. 17, 2000

(30) Foreign Application Priority Data

Aug. 17, 1999 (JP) .................................. 11-230916
May 30, 2000 (JP) ............................ 2000-160902
Jun. 15, 2000 (JP) ............................ 2000-180438

(51) Int. Cl.[7] .............................................. B23C 5/20
(52) U.S. Cl. ........................ 407/54; 407/113; 407/115
(58) Field of Search ......................... 407/113–119, 54, 407/56, 58, 63

(56) References Cited

U.S. PATENT DOCUMENTS

| | | | | |
|---|---|---|---|---|
| 1,912,666 A | * | 6/1933 | Swanson | 407/118 |
| 3,136,031 A | * | 6/1964 | Cassidy | 407/69 |
| 3,226,797 A | | 1/1966 | Hertel | |
| 3,245,288 A | * | 4/1966 | Fried | 407/111 |
| 3,341,923 A | * | 9/1967 | Kelm | 407/104 |
| 3,484,920 A | * | 12/1969 | Werner | 407/6 |
| 3,576,200 A | * | 4/1971 | Elmes | 83/848 |
| 3,887,974 A | * | 6/1975 | Sorice | 407/113 |
| 3,971,113 A | * | 7/1976 | Budke et al. | 407/118 |
| 4,182,587 A | * | 1/1980 | Striegl | 407/113 |
| 4,215,957 A | * | 8/1980 | Holma et al. | 407/114 |
| 5,207,538 A | * | 5/1993 | Satran | 407/113 |
| 5,383,750 A | * | 1/1995 | Satran et al. | 407/113 |
| 5,466,097 A | * | 11/1995 | Wallstrom | 407/113 |
| 5,474,406 A | * | 12/1995 | Kress et al. | 408/199 |
| 5,525,016 A | * | 6/1996 | Paya et al. | 407/116 |
| 5,529,440 A | * | 6/1996 | Schmidt | 407/113 |
| 5,586,843 A | * | 12/1996 | Minicozzi | 407/42 |
| 5,622,461 A | * | 4/1997 | Tukala et al. | 408/224 |
| 5,673,711 A | * | 10/1997 | Andrews | 132/215 |
| 5,718,540 A | * | 2/1998 | Satran et al. | 407/42 |
| 5,944,456 A | | 8/1999 | Shirley et al. | |
| 5,954,459 A | * | 9/1999 | Noguchi et al. | 408/59 |
| 5,971,676 A | * | 10/1999 | Kojima | 708/231 |
| 6,074,137 A | * | 6/2000 | Betman et al. | 407/118 |

(Continued)

FOREIGN PATENT DOCUMENTS

CN          1059488 A       3/1992

(Continued)

OTHER PUBLICATIONS

Patent Abstracts of Japan, JP 10-291115, Nov. 4, 1998.

(Continued)

*Primary Examiner*—Henry W. H. Tsai
(74) *Attorney, Agent, or Firm*—Oblon, Spivak, McClelland, Maier & Neustadt, P.C.

(57) ABSTRACT

A throwaway-type cutting tool including a tool body having a distal end, and a plurality of throwaway tips mounted to the distal end. Each of the plurality of throwaway tips including a plate of a substantially rectangular shape. The plate has a corner angle of two adjacent corner cutting edges of a first side in a surface being to 90° or less, and two opposing ridges on the first side including the two adjacent corner cutting edges are defined as cutting edges which are in a non-parallel orientation to each other. Each of the plurality of throwaway tips have a cutting edge arranged to project toward the distal end. The two adjacent corner cutting edges on the first side in each of the plurality of throwaway tips are arranged to project toward an outer periphery of the distal end of the tool body.

12 Claims, 20 Drawing Sheets

U.S. PATENT DOCUMENTS

| | | | |
|---|---|---|---|
| 6,132,146 A | * | 10/2000 | Satran et al. ............... 407/40 |
| 6,257,807 B1 | * | 7/2001 | Heinloth ..................... 407/113 |
| 6,270,292 B1 | * | 8/2001 | Satran et al. ............... 407/114 |

FOREIGN PATENT DOCUMENTS

| | | |
|---|---|---|
| DE | 32 42 765 | 7/1983 |
| DE | 37 25 154 | 2/1988 |
| EP | 0 416 901 | 3/1991 |
| JP | 8-323527 | 12/1996 |
| JP | 10-291115 | 11/1998 |
| JP | 11-138324 | 5/1999 |

OTHER PUBLICATIONS

Patent Abstracts of Japan, JP 61-038810, Feb. 24, 1986.
Patent Abstracts of Japan, JP 61-219503, Sep. 29, 1986.

* cited by examiner (d)

(a)

(c)

(b)

THROWAWAY TIP AND THROWAWAY-TYPE CUTTING TOOL

BACKGROUND OF THE INVENTION

1. Field of the Invention

The present invention relates to a throwaway tip and a throwaway-type cutting tool, such as an end-mill, to which the throwaway tip is mounted.

The disclosure of Japanese Application No. H11-230916, 2000-160902, 2000-180438 is hereby incorporated by reference into the present application.

2. Description of the Related Art

Hitherto, in some throwaway-type end mills in which a plurality of, for example, two, parallelogram plate-like throwaway tips are mounted to the distal end of a tool body, and which are capable of performing a boring operation, one tip has been arranged so that a long cutting edge is defined as a front cutting edge and a short cutting edge is defined as an outer peripheral cutting edge, and the other tip has been arranged so that a short cutting edge and a long cutting edge is defined as a front cutting edge and a long cutting edge is defined as an outer peripheral cutting edge.

In this case, if the two tips have the same shape and size, they are conveniently administered or replaced. When such an end mill is used for a shoulder-cutting operation or a drilling operation with the outer peripheral cutting edges provided along the rotation axis of the tool body, for example, when the front cutting edge of one tip is provided so that an outer-peripheral corner-side cutting edge is projected at the distal end to gradually incline inward to a base end, the inner corner cutting edge of the outer tip will project toward the distal end from the outer-peripheral-corner-side cutting edge, so that the front cutting edge is easily chipped at low speed.

In order to overcome such a drawback, when the front cutting edge of the other tip is arranged in a radial direction so as to prevent the inner corner cutting edge from projecting toward the distal end, since the outer peripheral cutting edge of the other tip is inclined inward from the outer peripheral cutting edge of one tip and does not serve as the outer peripheral cutting edge, the outer peripheral cutting edge performs cutting with a single edge of one tip so that the front cutting edge is easily chipped and cutting efficiency is low.

As an invention for improving such a defect, Japanese Unexamined Patent Application Publication No. 10-291115 discloses an end mill. In the end mill two types of parallelogram plate-like tips are used, which are in line symmetry and are rotated in opposite directions. A short cutting edge of one tip is used as a front cutting edge, and a long cutting edge of the other tip is used as a front cutting edge thereby adopting an arrangement such that an outer peripheral corner-side cutting edge of each of the front cutting edges is projected toward the distal end from an inner corner cutting edge. This can perform a cutting operation using outer peripheral corner-side cutting edges as two cutting edges, and can improve cutting efficiency by restricting chipping of the outer-peripheral-corner-side cutting edges.

In such a end mill, however, two types of tips having different outer shapes should be prepared, thereby making administration and replacement complicated, running costs increase, and the cost of manufacturing the tip increase.

SUMMARY OF THE INVENTION

In consideration of these actual circumstances, it is an object of the present invention to provide a throwaway tip including a plurality of types of cutting edges capable of arranging different cutting edges thereon.

It is another object of the present invention to provide a cutting tool capable of projecting outer peripheral corner-side cutting edges toward the distal and thereof using one type of throwaway tip.

According to the present invention, there is provided a throwaway tip formed in substantially the shape of a rectangular shape in which a corner angle of two adjacent corner cutting edges of one side in on surface (3) is set to 90° or less, and two opposing ridges on one side including these corner cutting edges are defined as cutting edges which are not parallel to each other.

In a case where a plurality of such throwaway tips are used and provided at the distal end of a tool body so that the two corner cutting edges on one side are located at the outer periphery of the distal end, if cutting edges on one side sandwiching the corner cutting edges are provided as outer peripheral cutting edges along the rotation axis of the tool body, the other cutting edges sandwiching the corner cutting edges are inclines as front cutting edges from the outer periphery toward the inside, so that front cutting edges, outer peripheral cutting edges, and the outer-peripheral-side corner cutting edges can be arranged as two cutting edges. These cutting edges are difficult to chip and cutting efficiency is high, and the tips can be easily stored.

According to the present invention, there is provided a throwaway-type cutting tool comprising a plurality of throwaway tips mounted to the distal end of a tool body, and each throwaway tip having a cutting edge arranged to project toward the distal end, wherein the plurality of throwaway tips are the same as one another according to any one of claims 1 to 4, and the two adjacent corner cutting edges on one side in each of the plurality of throwaway tips are arranged to project toward the outer periphery of the distal end of the tool body.

If the two corner cutting edges on one side are provided at the outer periphery of the distal end of the tool body, cutting can be started from the outer-peripheral-side corner cutting edges and chipping can be restricted when performing a drilling operation or the like, and when performing a shoulder-cutting operation or a groove-processing operation, a finishing operation can be performed by the corner cutting edges at the outer periphery of the distal end while performing the shoulder-cutting operation by the outer peripheral cutting edges.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1(*b*) is a side view, as seen from the direction A in FIG. 1(*a*).

FIG. 1(*c*) is a side view, as seen from the direction B in FIG. 1(*a*).

DETAILED DESCRIPTION OF THE PREFERRED EMBODIMENTS

Figure 1:
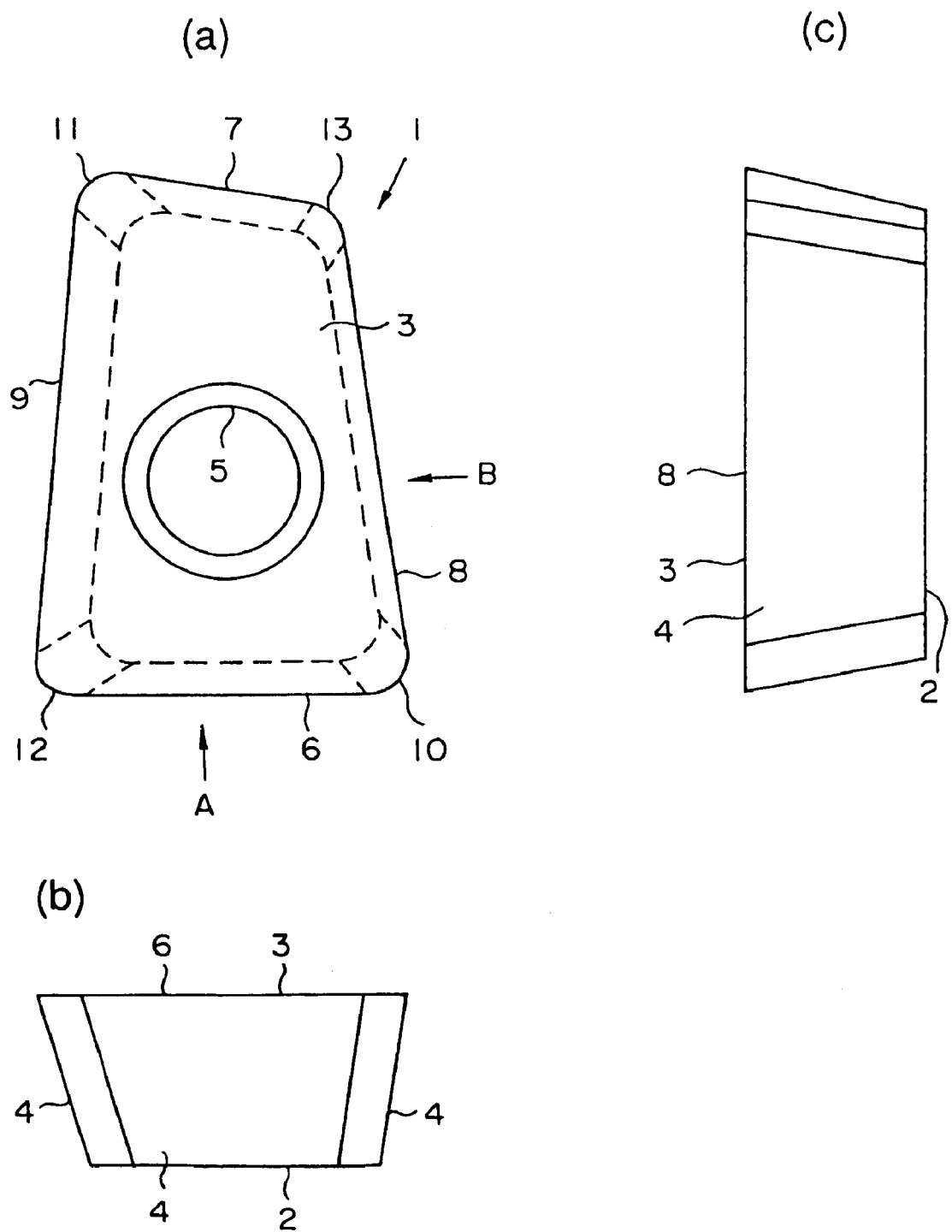
FIG. 1(*a*) is a plan view which shows a throwaway tip according to a first embodiment of the present invention.
Figure 2:
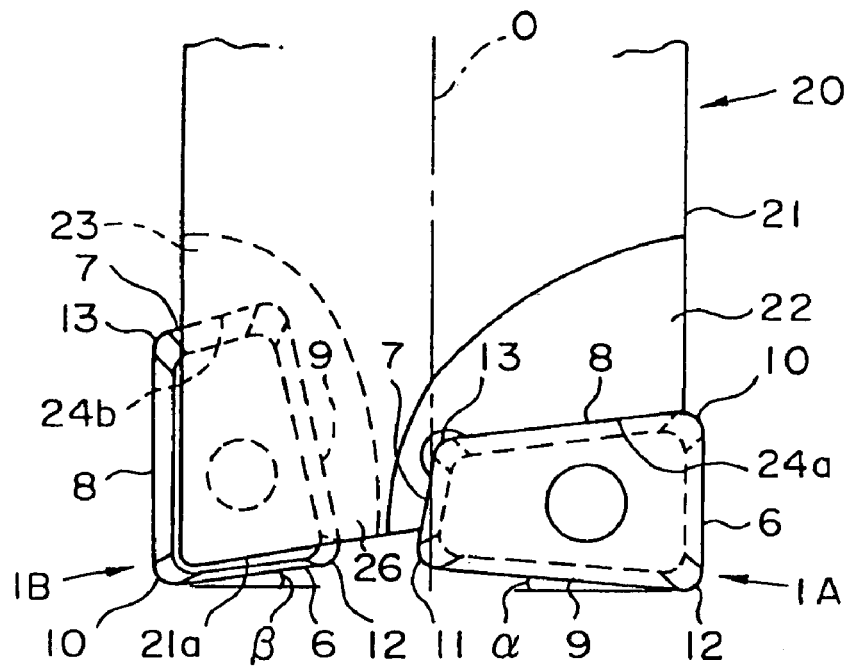
FIG. 2 is a partial side view of an end mill to which two throwaway tips shown in FIG. 1 are mounted.
Figure 3:
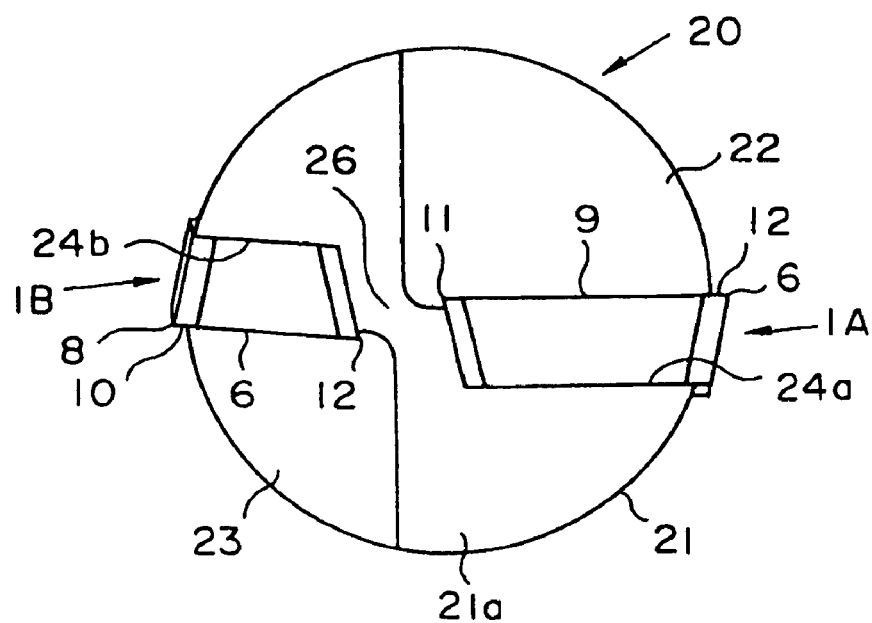
FIG. 3 is a front view of the end mill shown in FIG. 2.
Figure 4:
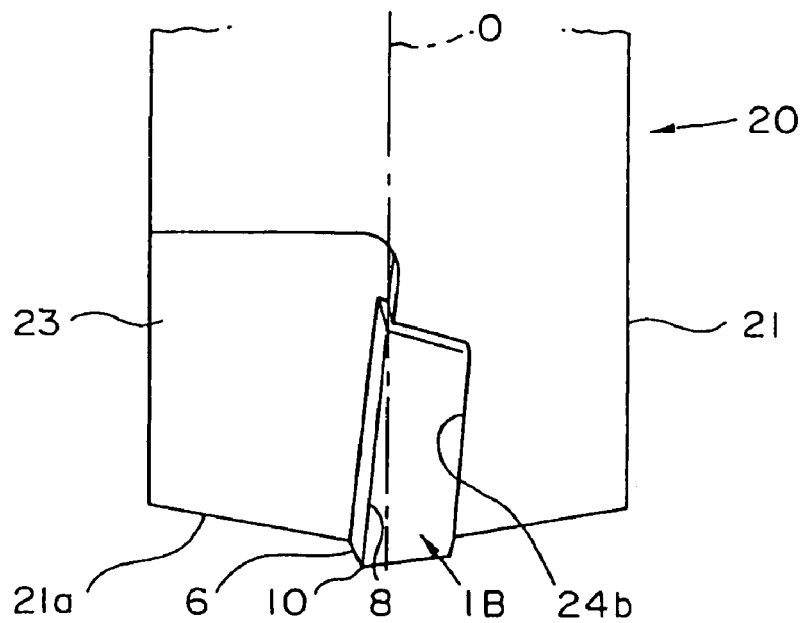
FIG. 4 is a side view of the end mill shown in FIG. 2, as seen from the direction of an outer peripheral cutting edge

A throwaway tip and throwaway-type end mill according to embodiments of the present invention will now be described with reference to accompanying drawings. FIG. 1 shows a throwaway tip according to a first embodiment, and FIGS. 2 to 4 show a throwaway-type end mill according to the first embodiment. FIG. 1(a) is a plan view of the throwaway tip, FIG. 1(b) is a side view of the throwaway tip shown in FIG. 1(a), as seen from a direction A, FIG. 1(c) is a side view of the same, as seen from a direction B, FIG. 2 is a partial side view of the end mill to which the throwaway tip shown in FIG. 1 is mounted, FIG. 3 is a front view of the end mill shown in FIG. 2, and FIG. 4 is a partial side view of the end mill shown in FIG. 2, as seen from an outer peripheral cutting edge.

The throwaway tip (hereinafter, it may be referred to as tip) 1 according to the embodiment shown in FIG. 1 is formed in substantially the shape of a rectangular plate, includes an upper surface 3 provided so as to oppose a lower surface 2 constituting a seating surface, and four side faces 4 gradually inclined outward with a positive inclination angle (relief angle) from the lower surface 2 to the upper surface 3, and is defined as a positive tip. The tip 1 is formed with a bolt-securing insertion hole 5 passing through central portions of the upper surface 3 and the lower surface 2. The upper surface 3 and the lower surface 2 are formed in substantially the shape of a parallelogram plate. In four ridges of the upper surface 3, the opposing ridges of each pair are defined as short cutting edges and long cutting edges, one of two cutting edges constituting the short cutting edges is defined as a relatively-long first short cutting edge 6, and the other cutting edge is defined as a relatively-short second cutting edge 7. The other two opposing sides constituting the long cutting edges are defined as, for example, a first long cutting edge 8 and a second long cutting edge 9 that are relatively longer than the first short cutting edge 6. Moreover, the opposing first short cutting edge 6 and the second short cutting edge 7 are not parallel to each other, and the other opposing first and second long cutting edges 8 and 9 are not parallel to each other. The upper surface 3 is defined as a rake face of each of the cutting edges 6, 7, 8, and 9, and each of the side faces 4 is defined as a relief face.

A first corner cutting edge 10 and a second corner edge 11 in one diagonal direction of the upper surface 3 are formed by the intersecting first short cutting edge 6 and the first long cutting edge 8, and the intersecting second short cutting edge 7 and the second long cutting edge 9 respectively, and each of the corner angles is set to 90° or less, preferably, an acute angle, a corner angle of a third corner cutting edge 12 consisting of the first short cutting edge 6 and the second long cutting edge 9 in the other diagonal direction is set to 90°, and preferably, an acute angle, and a corner angle of a fourth corner cutting edge 13 consisting of the second short cutting edge 7 and the first long cutting edge 8 is set to an obtuse angle. The corner angles of the first to third corner cutting edges 10, 11, and 12 may be either equal or unequal to one another.

The throwaway tip 1 of this embodiment is constructed as described above. An end mill 20 to which a plurality of throwaway tips 1 are mounted will now be described with reference to FIGS. 2 to 4.

At the distal end of a tool body 21 of the end mill 20, two concave grooves 22 and 23 are provided, which substantially oppose each other with respect to the rotation axis O defining the center of rotation and which are cut out into substantially a fan-shape in cross section. The concave grooves 22 and 23 are formed by cutting out the tool body 21 from a longitudinal outer peripheral surface in the middle thereof toward a distal end surface 21a, a tip-mounting seat 24a is formed on a surface of one concave groove 22 facing a rotation direction, a tip-mounting seat 24b is formed on a surface of the other concave groove 23 facing the rotation direction.

To one tip-mounting seat 24a, the above-described throwaway tip 1 is mounted with the second long cutting edge 9 defined as a front cutting edge and projected from the distal end surface 21a of the tool body 21 toward the distal end, and this tip is referred to as a main tip 1A. To the other tip-mounting seat 24b, the throwaway tip 1 is mounted with the first short cutting edge 6 defined as a front cutting edge and projected from the distal end surface 21a of the tool body 21 toward the distal end, and this tip is referred to as a sub-tip 1B. A state in which the first and second long cutting edges 8 and 9 are arranged in a direction to intersect the rotation axis O, as in the main tip 1A, is referred to as a lateral arrangement, and a state in which the first and second long cutting edges 8 and 9 are arranged in a direction along the rotation axis O, as in the sub-tip 1B, is referred to as a vertical arrangement.

In the main tip 1A, since the third corner cutting edge 12 is provided outside the distal end, the first short cutting edge 6 is provided so that it projects along the outer peripheral surface of the tool body 21 to be substantially in parallel with the rotation axis O, and is defined as an outer peripheral cutting edge, the second long cutting edge 9 projecting from the distal end surface 21a of the tool body 21 toward the distal end is inclined at an angle $\alpha\alpha$(for example, $\alpha\alpha$=5°) with respect to the line perpendicular to the rotation axis O so that it gradually comes close to the base end side from the outer periphery toward the rotation axis O, the second corner cutting edge 11 defining the acute angle of the other end of the second long cutting edge 9 is located on the opposite side of the rotation axis O, and the second short cutting edge 7 intersects the rotation axis O.

In the sub-tip 1B, since the first corner edge 10 is provided outside the distal end, the first long cutting edge 8 is provided so that it projects along the outer peripheral surface of the tool body 21 to be substantially in parallel with the rotation axis O and is defined as an outer peripheral cutting edge, the first short cutting edge 6 projecting from the distal end face 21a of the tool body 21 toward the distal end is inclined at an angle $\beta\beta$(for example, $\beta\beta$=7 to 10°, $\beta\beta$=$\alpha\alpha$ is acceptable) so that it gradually comes close to the base end side from the outer periphery toward the rotation axis O, and the third cutting edge 13 of the other end is separated away from the rotation axis O.

For this reason, the second short cutting edge 7, the second long cutting edge 9, and side faces 4 and 4 thereof located inside both tips 1A and 1B are gradually inclined outward from the distal end toward the base end in the direction away from the rotation axis O.

Figure 5:
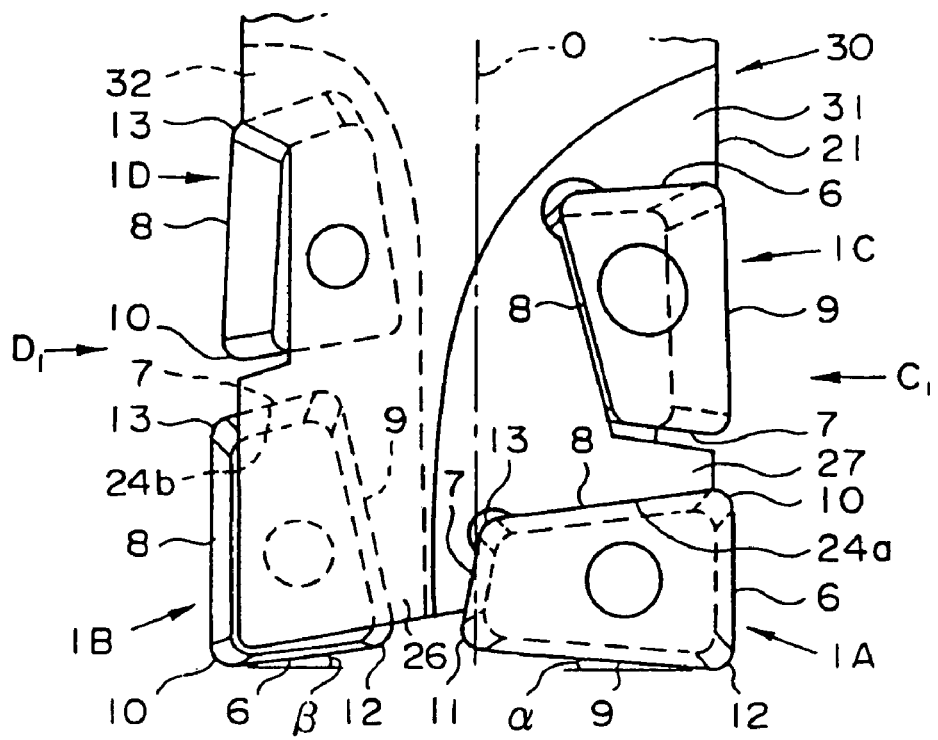
FIG. 5 is a side view of an end mill according to a second embodiment of the present invention

The main tip 1A and the sub-tip 1B are mounted in such a manner that the first axial rake angle of the first short cutting edge 6 and the first long cutting edge 8 defining each of the outer peripheral cutting edges is a positive angle, as shown in FIG. 4 (only the first long cutting edge 8 is shown in FIG. 5). As shown in FIG. 2, the second long cutting edge 9 defining the front cutting edge of the main tip 1A is located on the radial line around the rotation axis O, a radial rake angle is set to 0°, the first short cutting edge 6 defining the front cutting edge of the sub-tip 1B is located above the center of rotation of the tool body, and a radial rake angle is set to a negative angle.

Since the throwaway tip 1 and the end mill 20 according to this embodiment are constructed as described above, if a material to be cut is cut by rotating the tool body 21 around the rotation axis O, the corner cutting edges 12 and 10 on the outer periphery of the second long cutting edge 9 and the first cutting edge 6 projecting at the distal end of the tool body 21 bite into the material to be cut. Since this area is rotated at high speed as compared with an area near the rotation axis O cutting resistance during biting is low and a cutting operation can be performed without causing chipping. Furthermore, by feeding the tool body 21 to an end of the rotation axis O, a rotary cutting operation can be performed like a drill with the second long cutting edge 9 and the first short cutting edge 6 whose rotation paths overlap.

By feeding the tool body 21 in the lateral direction, outer peripheral cutting can be performed with the first short cutting edge 6 and the first long cutting edge 8 defining the outer peripheral cutting edges, and a finish cutting operation can be performed with the corner cutting edges 12 and 10 of the second long cutting edge 9 and the first short cutting edge 6. Alternatively, a shoulder-cutting operation or a groove-processing operation can be performed with the first cutting edge 6 and the long cutting edge 8 defining the outer peripheral cutting edges.

Even if the cutting edges of one of the tips 1A and 1B are chipped or worn, the same throwaway tips 1 may be replaced and mounted.

As described above, according to this embodiment, a plurality of the same tips 1 can be mounted to the tool body with different mounting angles and in different postures so that the second long cutting edge 9 and the first short cutting edge 6 can be arranged as front cutting edges, and the short cutting edge 6 and the long cutting edge 8 can be arranged as outer peripheral cutting edges, and only one type of replacement tip need be stored. Therefore, the cost of manufacturing the tips and the running costs of the cutting tool can be reduced.

Moreover, since the corner angle of at least the first and third corner cutting edges 10 and 12 on both sides of the first short cutting edge 6 is set to 90° or less, for example, an acute angle, the corner cutting edges 10 and 12 at an outer-peripheral-side of the distal end of the main tip 1A and the sub-tip 1B can be provided in a state of being projected greatest, and since the corner cutting edges 10 and 12 can be arranged as two cutting edges whose rotation paths overlaps with restricting the chipping of the corner cutting edges 10 and 12, the cutting efficiency is high. In addition, the side faces 4 inside the main tip 1A and the sub-tip 1B are gradually inclined from the distal end of the tool body 21 toward the base end in the direction away from the rotation axis O. Therefore, the thickness of a center portion 26 of the distal end of the tool body 21 sandwiched by the tips 1A and 1B can be increased and ensured, and the rigidity of the tool body 21 can be secured.

A second embodiment of the present invention will now be described with reference to FIGS. 5 to 7. The same or similar portions to those of the above-described first embodiment are indicated by the same reference numerals and a description thereof will be omitted. FIG. 5 is a side view of a throwaway-type end mill according to the second embodiment.

Figure 6:
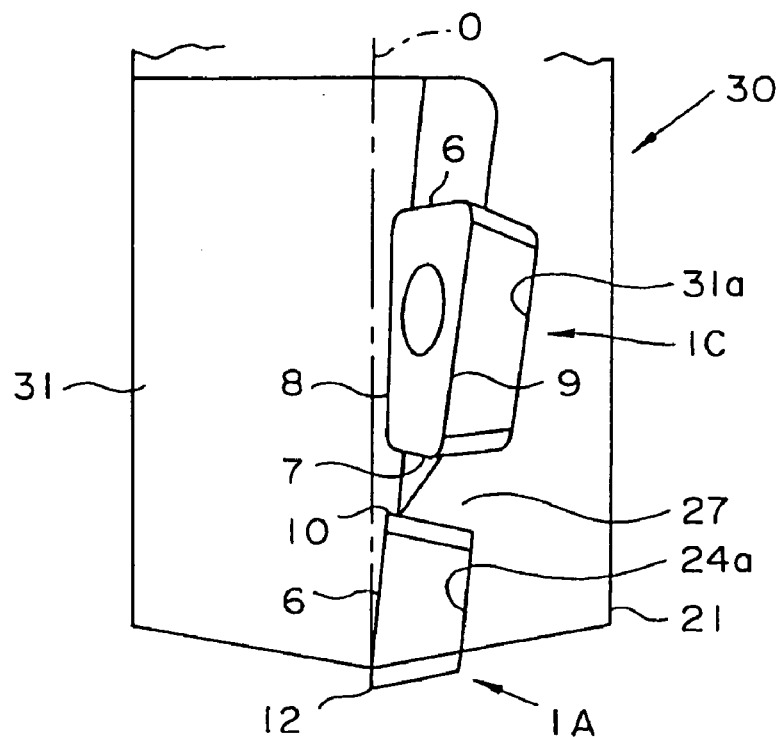
FIG. 6 is a side view of the end mill shown in FIG. 5, a seen from the direction C1.
Figure 7:
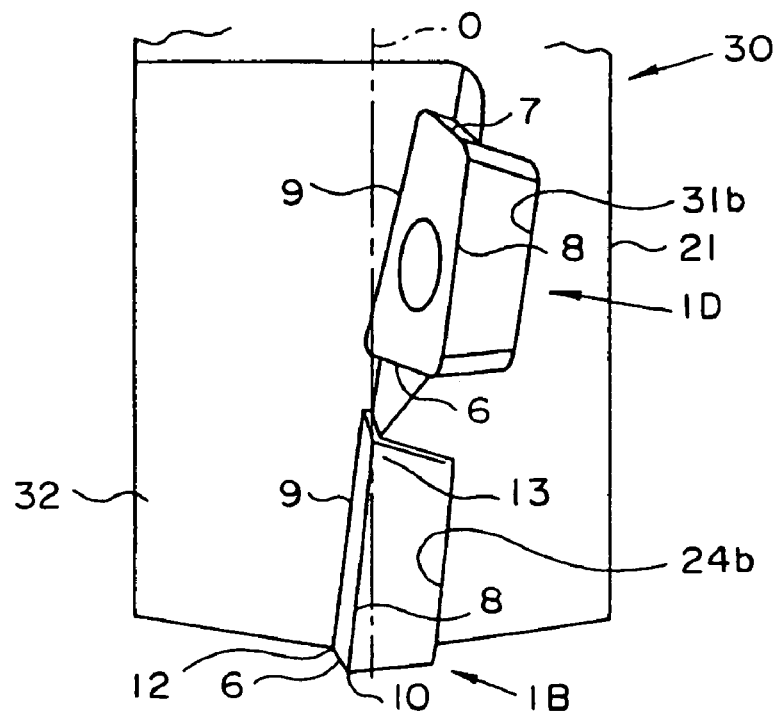
FIG. 7 is a side view of the end mill shown in FIG. 5, as seen from the direction D1.

FIG. 6 is a side view of the end mill shown in FIG. 5, as viewed from the direction C, and FIG. 7 is a side view of the same, as viewed from the direction D. A throwaway-type end mill 30 shown in FIGS. 5 to 7 according to the second embodiment has the same construction as the throwaway-type end mill 20 according to the above-described first embodiment. At the distal end of a tool body 21, two concave grooves 31 and 32 are provided, which substantially oppose each other with respect to the rotation axis O defining the center of rotation and which are cut out into substantially a fan-shape in cross section. The concave grooves 31 and 32 have tip-mounting seats 24a and 24b formed on the distal end surfaces thereof facing a rotation direction, and a main tip 1A and a sub-tip 1B are attached thereto, respectively. The arrangement of the tips 1A and 1B is the same as the above-described first embodiment.

In one concave grooves 31, a tip-mounting seat 31a is further formed at the base end side of the main tip 1A, and the above-described throwaway tip 1 is attached thereto as a third tip 1C. The third tip 1C is provided in such a manner that a second long cutting edge 9 is projected as an outer peripheral cutting edge from the outer peripheral surface of the tool body 21 to the outside in the radial direction so as to be located substantially in parallel with the rotation axis O, and a second short cutting edge 7 is directed to the distal end.

An axial rake angle of the second long cutting edge 9 is set to a positive angle, as shown in FIG. 6, and the second long cutting edge 9 is shifted toward the base end from a first long cutting edge 8 defining an outer peripheral cutting edge of the sub-tip 1B that is located on the opposite position across the rotation axis O of the tool body 21 so that its rotation path overlaps the rotation path of the first long cutting edge 8. Moreover, the first short cutting edge 6 of the main tip 1A and the second long cutting edge 9 of the third tip 1C each defining an outer peripheral cutting edge are twisted rearward in the rotation direction of the tool body 21 from the distal end toward the base end.

In the other concave groove 32, a tip-mounting seat 31b is further formed at the base end side of the sub-tip 1B, and the above-described throwaway tip 1 is attached thereto as a fourth tip 1D. The fourth tip 1D is provided in such a manner that the first long cutting edge 8 is projected as an outer peripheral cutting edge from the outer peripheral surface of the tool body 21 to the outside in the radial direction so as to be located substantially in parallel with the rotation axis O, and the first short cutting edge 6 is directed to the distal end.

An axial rake angle of the first long cutting edge 8 is set to a positive angle, as shown in FIG. 7, and the first long cutting edge 8 is shifted toward the base end from a second long cutting edge 9 defining an outer peripheral cutting edge of the third 1C that is located on the opposite position across the rotation axis O of the tool body 21 so that its rotation path overlaps the rotation path of the second long cutting edge 9. Moreover, the first long cutting edge 8 of the sub-tip 1B and the first long cutting edge 8 of the fourth tip 1D each defining an outer peripheral cutting edge are twisted rearward in the rotation direction of the tool body 21 from the distal end toward the base end.

According to the end mill 30 of the second embodiment, the main tip 1A located at the distal end of the tool body 21 is arranged in the vertical direction so that the first short cutting edge 6 defines an outer cutting edge, and the sub-tip 1B is arranged in the lateral direction so that the first long cutting edge 8 defines an outer peripheral cutting edge. Therefore the third tip 1C and the fourth tip 1D can be arranged at the base end side of the main tip 1A and the sub-tip 1B so that the rotation paths of the outer peripheral cutting edges continue, and a deep hole processing can be performed. Moreover, this can be achieved by using the tips 1A, 1B, 1C and 1D that are the same as one another.

The number of the tips 1 arranged is not necessarily four, and three or more than five tips may be arranged. Furthermore, in accordance with the arrangement of the main tip 1A in relation to the third tip 1C, since the first long cutting edge 8 located at the base end side of the main tip 1A is gradually inclined to the distal end from the outer periphery of the tool body 21 toward the rotation axis O, and the second short cutting edge 7 of the third tip 1C is inclined to the base end from the outer periphery toward the rotation axis O, the thickness of an outer peripheral portion 27 between the tips 1A and 1C can be increased from the outer periphery toward the inside. Therefore, the strength of the tool body 21 can be secured together with the strength of a center portion 26 of the distal end thereof.

In FIGS. 5 to 7, one or both of the third tip 1C may be arranged in the lateral direction, and the first short cutting edge 6 and/or the second short cutting edge 7 may be defined as outer peripheral edges. Alternatively, the third tip 1C and the fourth tip 1D may be turned upside down and arranged in the vertical direction, and the first long cutting edge 8 and the second long cutting edge 9 may be defined as outer peripheral cutting edges. In short, the tips may be arranged either in the vertical direction or in the lateral direction as long as they can be arranged so that the rotation paths of the peripheral cutting edges overlap.

Another example of the throwaway tip of the present invention will now be described as a third embodiment. The same or similar portions to those of the throwaway tip 1 according to the first embodiment will be described using the same reference numerals.

Figure 8:
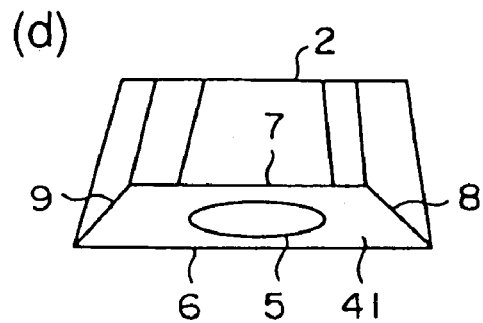
FIG. 8(a) is a plan view which shows a throwaway tip according to a third embodiment of the present invention
FIG. 8(b) is a side view of a tip shown in FIG. 8(a), as seen from the direction E1.
FIG. 8(c) is a side view of a tip shown in FIG. 8(a), as seen from the direction F1.
FIG. 8(d) is a side view of a tip shown in FIG. 8(a), as seen from the direction G1.
Figure 8:
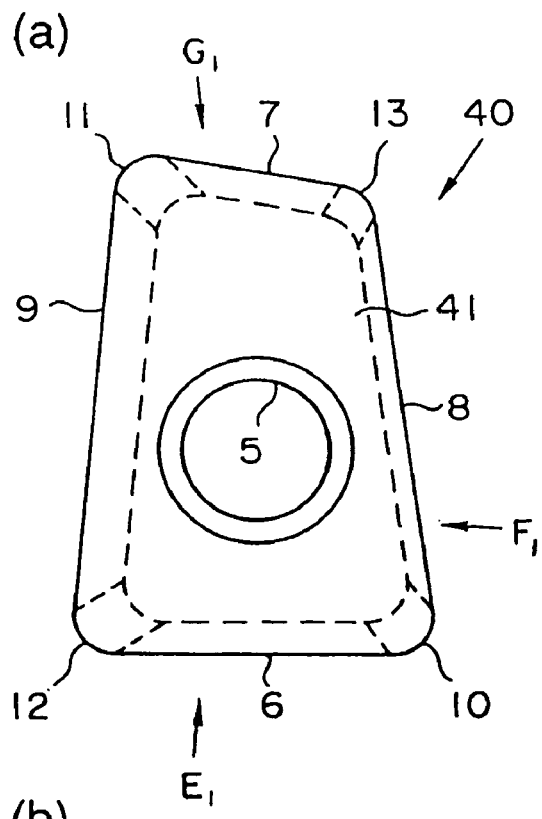
Figure 8:
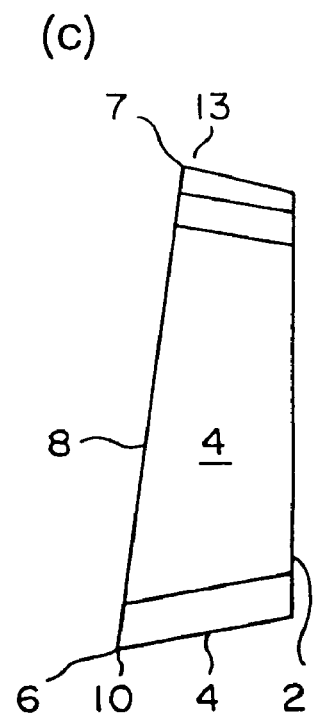
Figure 8:
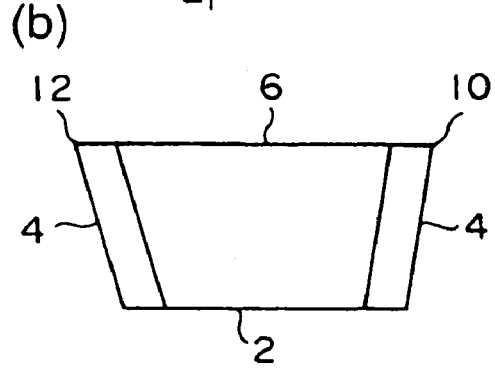

FIG. 8(*a*) is a plan view of a throwaway tip according to this embodiment, FIG. 8(*b*) is a side view of the throwaway tip shown in FIG. 8 (a, as seen from the direction E. FIG.

8(*c*) is a side view of the same, as seen from the direction F, and FIG. 8(*d*) is a side view of the same, as seen from the direction G.

Figure 9:
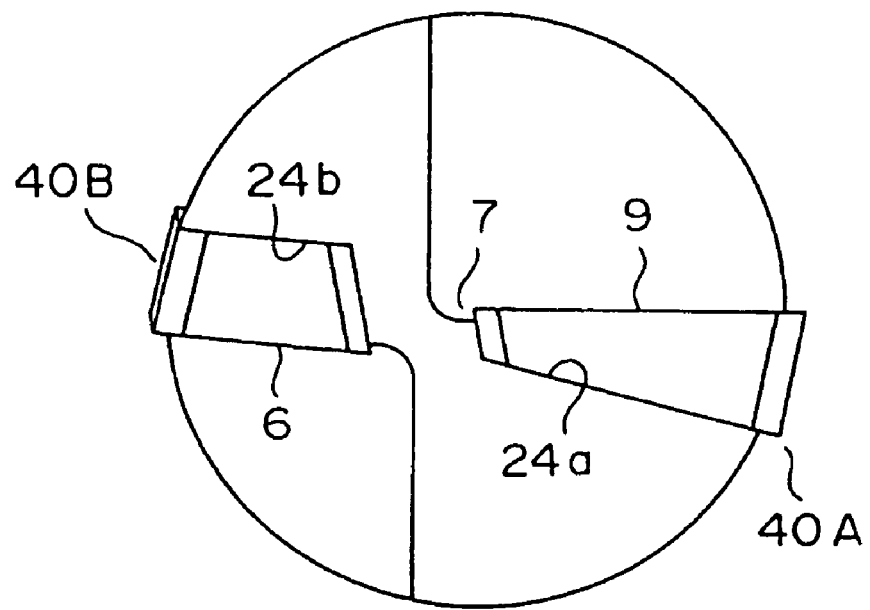
FIG. 9 is a front view of an end mill shown in FIG. 8 to which the throwaway tip shown in FIG. 8 is mounted.
Figure 10:
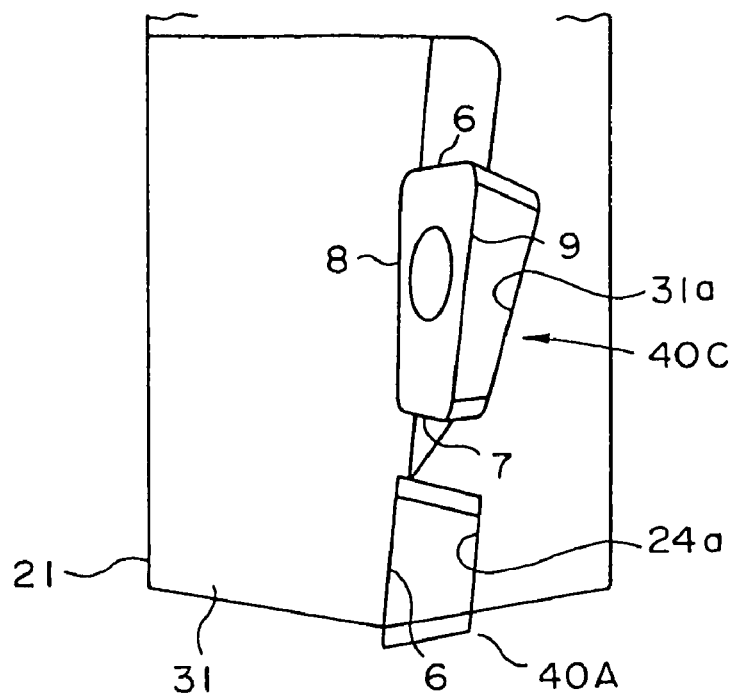
FIG. 10 is a side view of the end mill shown in FIG. 8, as seen from the direction of one outer peripheral cutting edge
Figure 11:
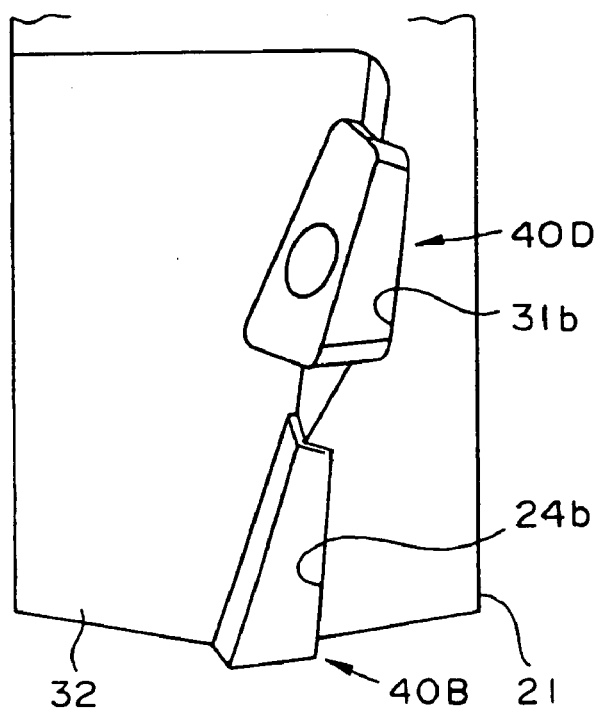
FIG. 11 is a side view of the end mill shown in FIG. 8, as seen from the direction of the other outer peripheral cutting edge

A throwaway tip (hereinafter, it may be referred to as tip) 40 shown in FIG. 8 according to the third embodiment is formed in substantially the shape of a rectangular plate, an upper surface 41 which opposes a lower surface 2 defining a seating surface is formed in a planar shape which is inclined from a first short cutting edge 6 toward an opposing second short cutting edge 7 so that the distance between the upper surface 41 and the lower surface 2 is gradually shortened, and therefore, a first long cutting edge 8 and a second long cutting edge 9 are straight-lined cutting edges inclined from the first short cutting edge 6 toward the second short cutting edge 7. Therefore, the distance between the first short cutting edge 7 and the lower surface 2 is formed shortest. An insertion hole 5 passing through the upper and lower surfaces 41 and 2 is formed in a direction to intersect nearly perpendicularly to the lower surface 2. Alternatively, the insertion hole 5 may be made to intersect perpendicularly to the upper surface 41. In mounting such a tip 40 to the above-described end mill 30 (20) instead of the tip 1, if the tip 40 is mounted so that an radial rake angle or an axial rake angle of each cutting edge is not changed, the thickness of tip-mounting seats 24*a*, 24*b*, 31*a*, and 32*a* formed on the back of the tip can be increased and the strength of a tool body 21 can be increased. In a main tip 40A shown in FIG. 9 and a third tip 40C shown in FIG. 10, the thickness of the tip-mounting seats 24*a* and 31*a* on the side of the second short cutting edge 7 can be increased. When the tip 40 or 1 is mounted to the tip-mounting seat without changing the posture of the seating surface (lower surface 2, in a sub-tip 40B and a fourth tip 40D in which a first short cutting edge 6 is located at the distal end, as shown in FIG. 11, an axial rake angle of a first long cutting edge 8 serving as an peripheral cutting edge can be increased, and the cutting quality in the outer peripheral cutting can be improved.

In mounting the tip 1 according to the first embodiment and the tip 40 according to the third embodiment to an end mill, the arrangement of the tips 1 and 40 is not limited to one form in which the main tips 1A and 40A are arranged in the lateral direction at the distal end of the tool body 21 and the sub-tips 1B and 40B are arranged in the vertical direction, as shown in the end mill 20 and 30 of the first and second embodiments, and other suitable arrangement forms may be adopted.

Figure 12:
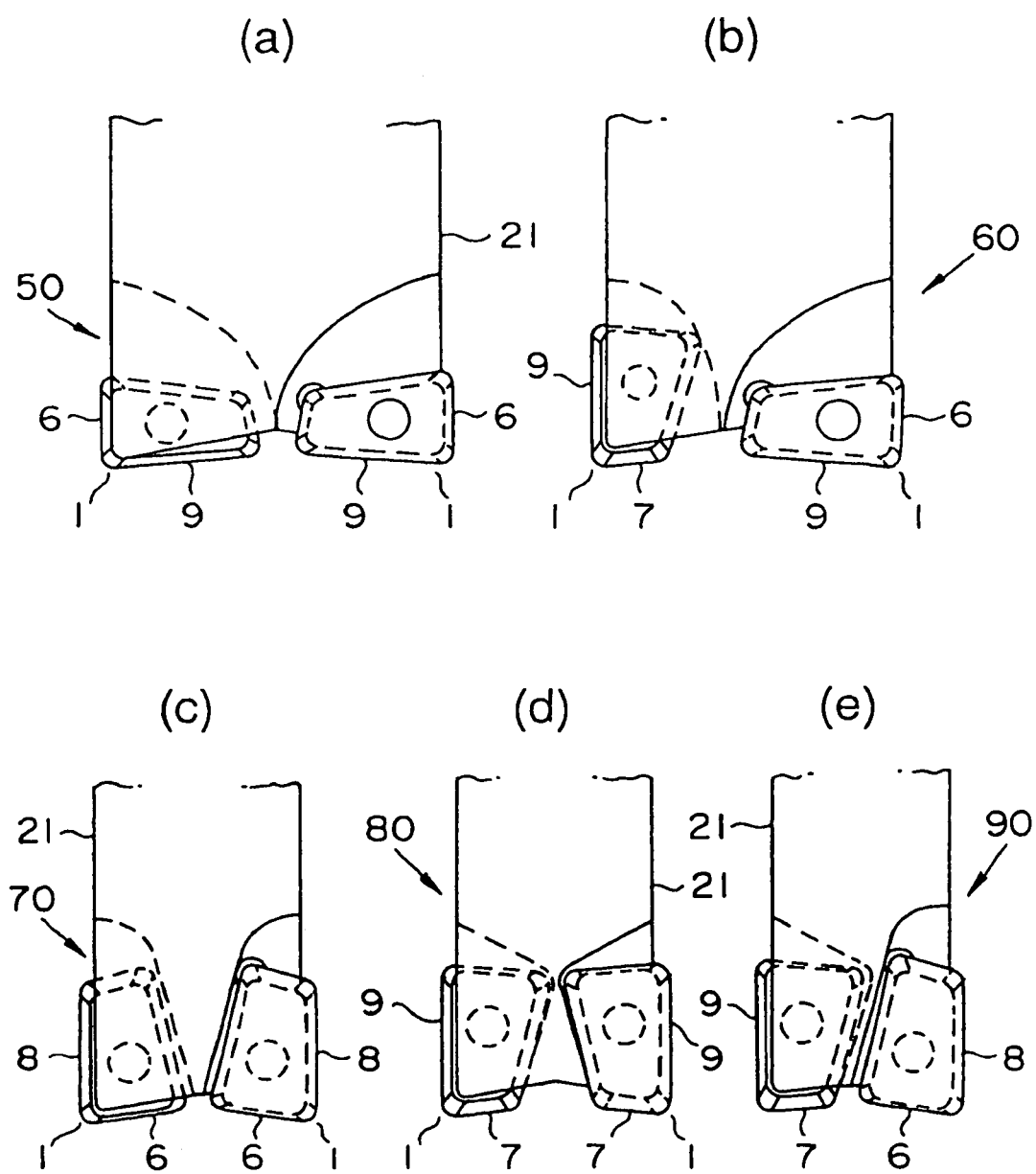
FIG. 12(a) is a front view which shows another example of an end mill to which a throwaway tip is mounted.
FIG. 12(b) is a front view which shows another example of an end mill to which a throwaway tip is mounted.
FIG. 12(c) is a front view which shows another example of an end mill to which a throwaway tip is mounted.
FIG. 12(d) is a front view which shows another example of an end mill to which a throwaway tip is mounted.

For example, in FIG. 12(*a*), if two tips 1 and 1 (40 and 40) are arranged in the lateral direction to define first short cutting edges 6 and 6 as outer peripheral cutting edges and define second long cutting edges 9 and 9 as front cutting edges, this arrangement form can be adopted to a tool body 21 having a large outer diameter. An end mill 50 can be applied to a large-diameter-hole drilling operation. In an end mill 60 shown in FIG. 12(*b*), one tip 1 is arranged in the lateral direction to define a first short cutting edge 6 as an outer peripheral cutting edge and define a second long cutting edge 9 as a front cutting edge overlapping the rotation axis O and the other tip is arranged in the vertical direction to define a second short cutting edge 7 as a front cutting edge and define a second long cutting edge 9 as an outer peripheral cutting edge. In an end mill 70 shown in FIG. 12 (c), two tips 1 and 1 (40 and 40) are arranged in the vertical direction to define each first short cutting edge 6 as a front cutting edge and define each first long cutting edge 8 as an outer peripheral cutting edge.

In an end mill 80 shown in FIG. 12(*d*) two tips 1 and 1 (40 and 40) are arranged in the vertical direction to define each second short cutting edge 7 as a front cutting edge and define each second long cutting edge 9 as an outer peripheral cutting edge. In an end mill 90 shown in FIG. 12(*e*), both two tips 1 and 1 (40 and 40) are arranged in the vertical direction to define a first short cutting edge 6 of one tip 1 as a front cutting edge, define a first long cutting edge 8 as an outer peripheral cutting edge, define a second short cutting edge 7 of the other tip 1 as a front cutting edge, and define a second long cutting edge 9 as an outer peripheral cutting edge. In this case, in the end mills 50, 70, 80, 90, a portion left uncut (a core remainder) is produced between the two tips 1 and 1 during cutting, but the portion can be picked up by the end mills if the thickness of the core remainder of a material to be cut is small. If the end mills are fed in the lateral direction, the portion left uncut can be cut off. Since the second long cutting edge 9 of one tip 40 overlaps the rotation axis O in the end mill 60, no core remainder is produced.

Figure 13:
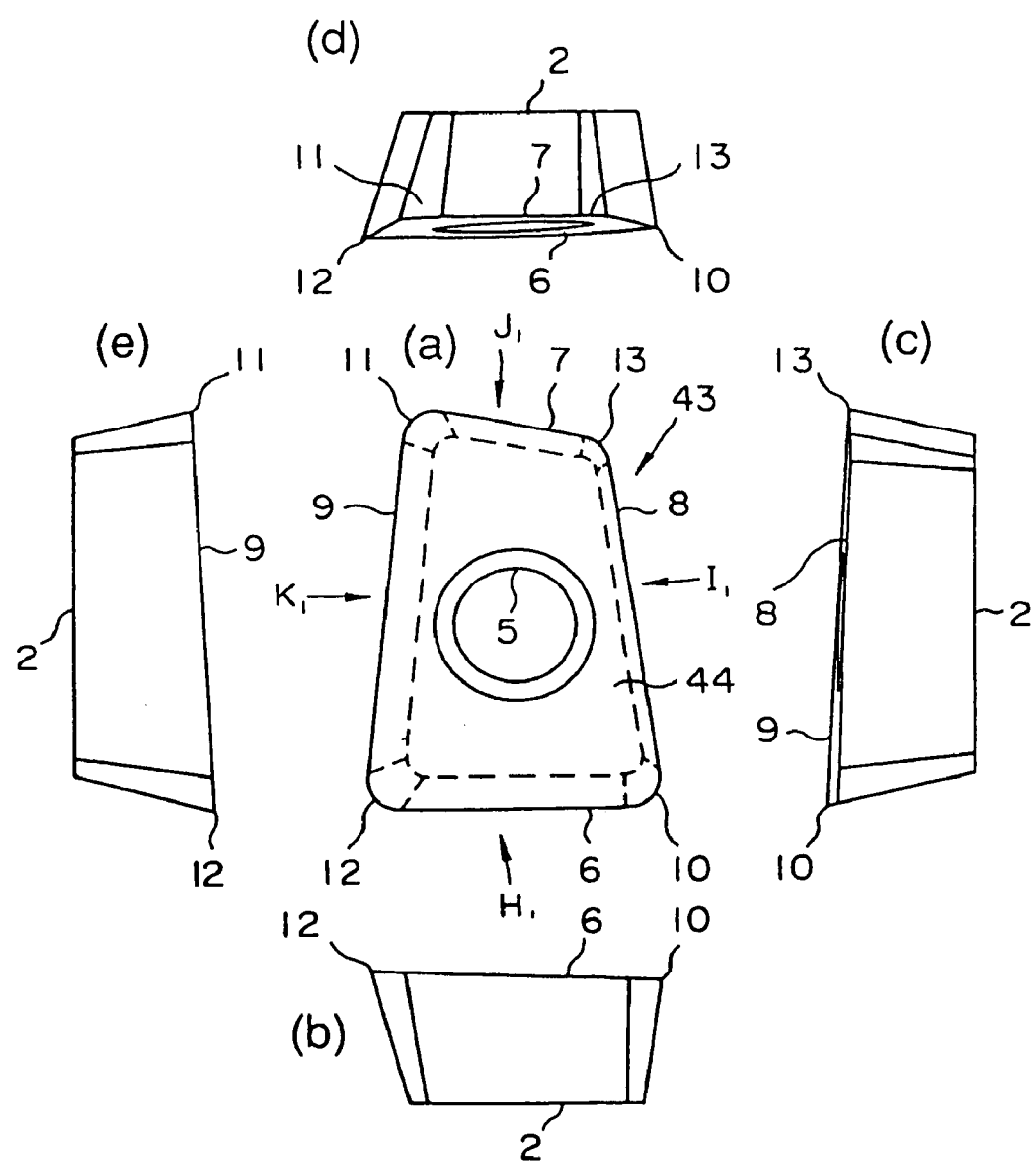
FIG. 13(a) is a plan view of a throwaway tip according to a modification of the third embodiment.
FIG. 13(b) is a side view of a tip shown in FIG. 13(a) as seen from the direction H1.
FIG. 13(c) is a side view of a tip shown in FIG. 13(a) a as seen from the direction I1.
FIG. 13(d) is a side view of a tip shown in FIG. 13(a) as seen from the direction J1.
FIG. 13(e) is a side view of a tip shown in FIG. 13(a), as seen from the direction K1.

A throwaway tip may have a construction shown in FIG. 13 as a modification of the tip 40 according to the third embodiment. FIG. 13(*a*) is a plan view of a throwaway tip according to this modification, FIG. 13 (b) is a side view of the throwaway tip shown in FIG. 13(*a*), as seen from the direction H1, FIG. 13(*c*) is a side view of the same, as seen from the direction I1, FIG. 13(*d*) is a side view of the same, as viewed from the direction J1, and FIG. 13(*e*) is a side view of the same, as viewed from the direction K1.

A throwaway tip 43 according to a modification shown in FIG. 13 is formed in substantially the shape of a rectangular plate, an upper surface 44 which opposes a lower surface 2 defining a seat surface is formed into a twisted surface, and therefore, a first short cutting edge 9, a second short cutting edge 7, a first long cutting edge 8, and a second long cutting edge 9 are linear-shaped cutting edges inclined at an arbitrary angle so that the distance between the lower surface 2 and these cutting edges gradually changes from one end of each of the corner cutting edges toward the other end. An insertion hole 5 passing through the upper and lower surfaces 44 and 2 is formed in a direction to intersect nearly perpendicularly to the lower surface 2. The insertion hole may be made to intersect perpendicularly to the upper surface 44.

The adoption of such a construction can set a suitable radial rake angle and an axial rake angle according to the mounting position or the posture of each cutting edge.

Breaker grooves may be formed in the upper surfaces 3, 41, 44.

The front cutting edges of the two tips 1 and 1 (40 and 40, 43 and 43) may be provided at a position above the center of rotation of the tool body or at a position below the center of rotation of the tool body.

In the tips 1, 40, 44 of the third embodiments, the corner angles of the first and third corner cutting edges 10, 11, and 12 may be either equal or unequal to one another.

While the long cutting edges 8 and 9 and the short cutting edges 6 and 7 in the throwaway tips of the above-described first and third embodiments and the modification are straight-lined cutting edges, they may be instead convexly curved cutting edges or concavely curved cutting edges, In this case, the upper surfaces 41 and 44 may be convex surfaces or concave surfaces.

The throwaway tip according to the present invention may be mounted to various types of cutting tools, such as other types of rolling tools or turning tools without being limited to the end mills 30, 50, 60, 70, 80, and 90.

Figure 14:
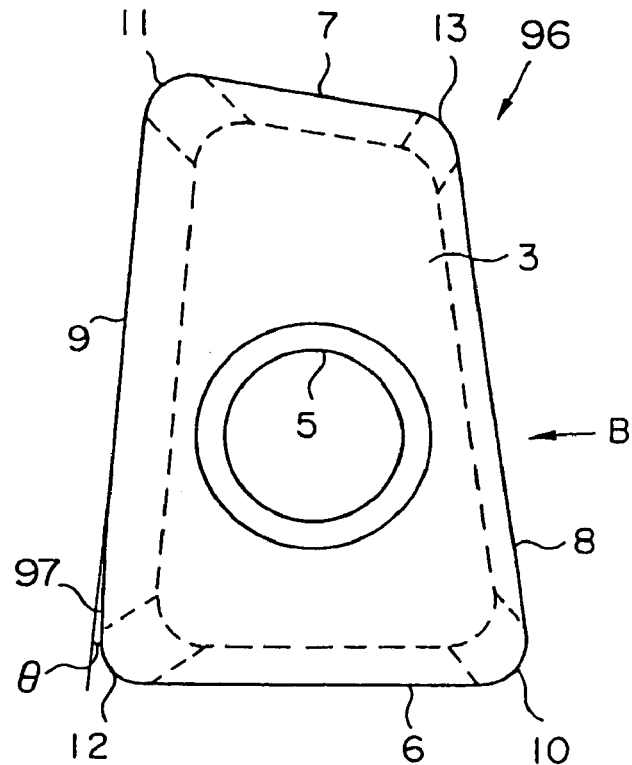
FIG. 14 is a plan view which shows a throwaway tip according to an 4th embodiment of the present invention.
Figure 15:
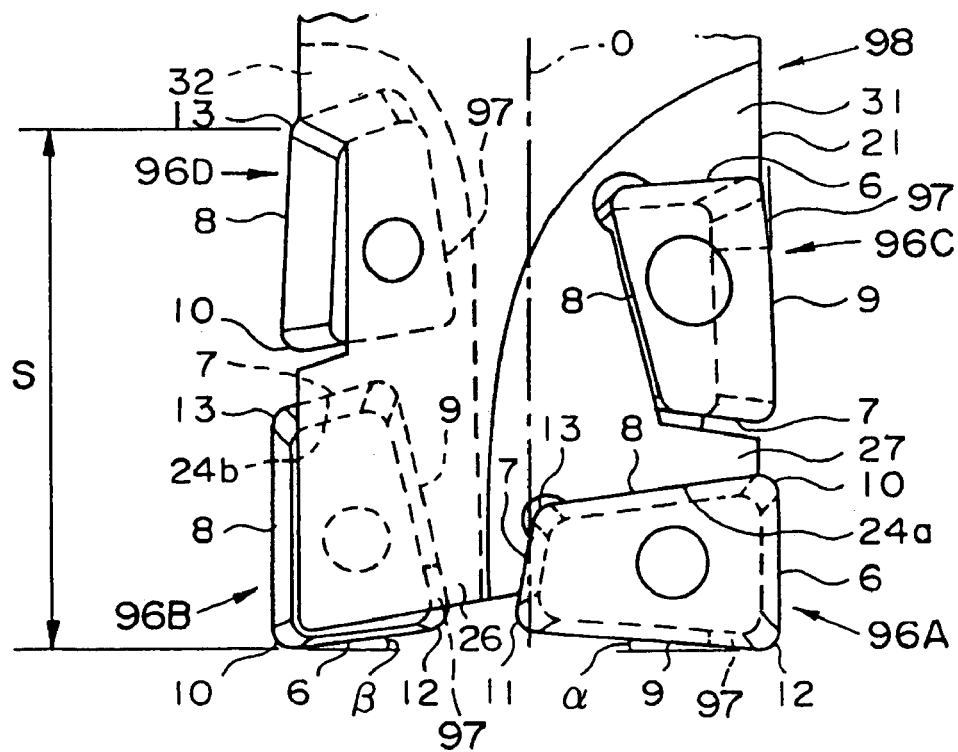
FIG. 15 is an side view of an end mill according to an 5th embodiment of the present invention.

[4th embodiment] The 4th embodiment in this invention is explained in FIG. 14 and FIG. 15. The explanation is omitted using the same marks in a same or similar portions to those of above mentioned 2nd embodiment. FIG. 14 is a plane view of the throwaway tip according to the 4th embodiment, FIG. 15 is side view of an end mill of throwaway type according to the 4th embodiment. Throwaway tip 96 shown in FIG. 14 is the one that the sub-cutting tooth 97 is formed with the inclination to the other portions so that it may retreat inside the field 3 of 1 as it approaches the third corner tooth 12 in the end portion including the third corner tooth 12 of the second long tooth 9, in a throwaway tip 1 according to 1 st embodiment shown in FIG. 1.

The angle $\theta$ (for example $\theta=5°$) inclination of the sub-cutting tooth 97 is done to other portions of the second long tooth 9.

The throwaway type end mill 98 according to the 4th embodiment is equipped with the same construction as the throwaway type end mill 30 according to above mentioned the 2nd embodiment, the tip 96 is replaced with a tip 1. In a tip part of the main part 21 of a tool, Two concave grooves 31, 32 which cut and lacked in the cross-sectional practically sector are formed, almost opposite to rotation axis O which makes the rotation center. In a tip side of each concave grooves 31, 32, the tip attachment seats 24a, 24b are formed in the field where each concave grooves 31, 32 turn to the rotation direction, and it is equipped with main tip 96A and sub-tip 96B respectively. The arrangement construction of these tips 96A, 96B is the same as the arrangement construction of the tips 1A and 1B in the second embodiment mentioned above. And in above mentioned arrangement construction, the sub-cutting tooth 97 formed in the second long tooth 9 of tip 96A is projected to the tip side of the main part 21 of a tool rather than other portions of the second long tooth 9. Moreover, the second long tooth 9 of a tip 96B is located in the inner circumference side of the main part 21 of a tool, and don't act on cutting. And the tip attachment seat 31a is further formed in the base edge side of main tip 96A in the other concave groove 31, and the throwaway tip 96 mentioned above is equipped as the third tip 96C. This third tip 96C is projected to the out side of radius direction from the perimeter face of the main part 21 of the tool as the perimeter tooth of the second long tooth 9, and is located almost parallel to the rotation axis O, and is set toward the second short tooth 7 in a tip side. In this attachment construction, the sub-cutting tooth 97 formed in a third tip 96C has escaped to the inner circumference side of a main part 21 of a tool to other portions of the second long tooth 9. Next, tip attachment seat 31b is also formed in a base side of sub-tip 96B in the other concave groove 32, and the throwaway tip 96 mentioned above is set as the fourth tip 96D. This fourth tip 96D is projected to outer side of radius direction from the main part 21 of a tool as the perimeter tooth of the first long tooth 8, and is located almost parallel to the rotation axis O, and is set toward the first short tooth 6 in the tip side.

In this construction, the second long tooth 9 of a tip 96D is located in the inner circumference side of a main part 21 of a tool, don't act on cutting. According to end mill 98 by this fourth embodiment, the sub-cutting tooth 97 of a tip 96A can be used in a finish cutting in a throwaway tip 96, and the sub-cutting tooth 97 in a tip 96B, 96C, 96D don't act on a cutting of work material. Thus, in end mill 98, since the advance of the wear of sub cutting tooth 97 is prevented except the use of the second long tooth 9 as front face tooth, the throwaway tip 96 can secure the sharpness of the sub-cutting tooth 97, and when it uses the sub-cutting tooth 97 as a front face tooth and performs finish machining of a work material, it can aquire a good finished surface. Moreover, in tip 96D located in the most base edge side of a main part 21 of a tool, since the first long tooth 8 which is not formed sub-cutting tooth 97 as a perimeter tooth is used, it can be possible to hold the maximum cutting of depth S of throwaway type cutting tool, forming sub-cutting tooth 97 in the second long tooth 9.

In addition, the arrangement number of sheets of a tip 96 is not necessarily four sheets, three sheets or more than five sheets may be set.

Moreover, in the fourth embodiment mentioned above, although the throwaway tip 96 shall consist of having formed the sub-cutting tooth 97 in the second long tooth 9 in a throwaway tip 1 by the first embodiment shown in FIG. 1, not only limiting in this, it may consist of forming the sub-cutting tooth 97 in the second long tooth 9 in a throwaway tip 40 or 43. Moreover, you may equip not only end mill 98 but also other end mill with the throwaway tip 96.

Figure 16:
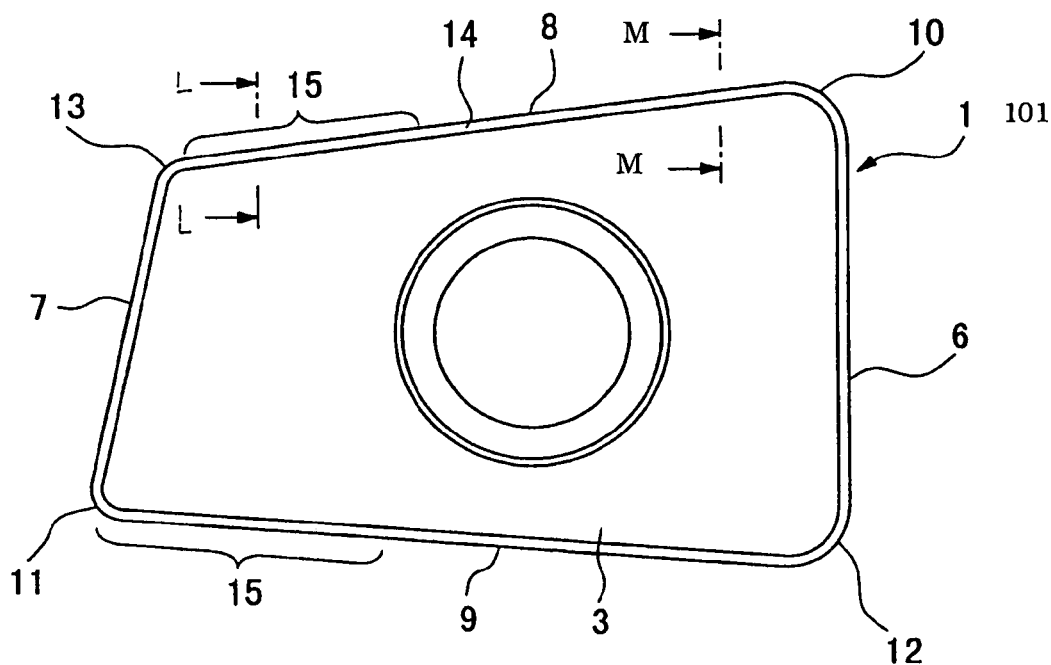
FIG. 16 is a plan view of an throwaway tip according to an 5th embodiment of the present invention.
Figure 17:
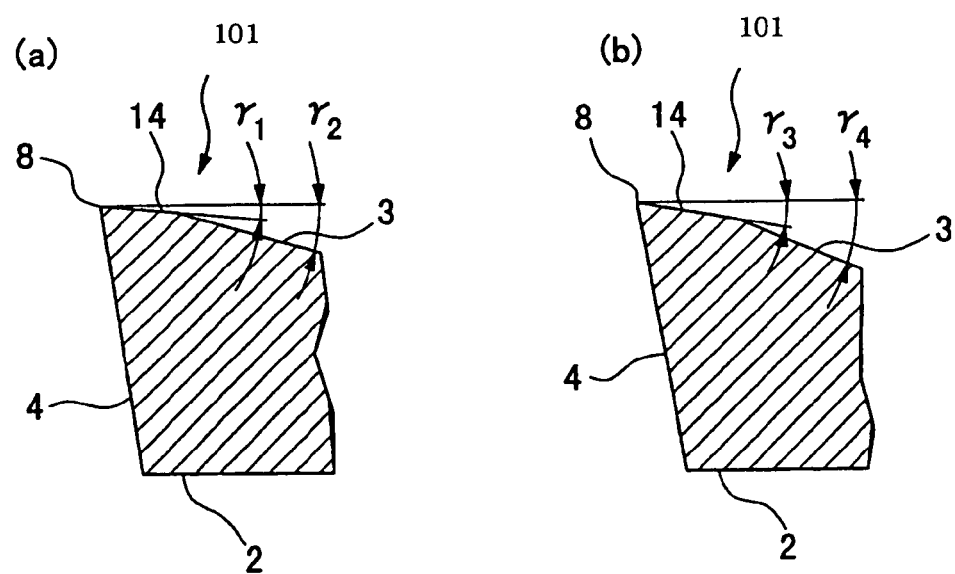
FIG. 17(a) is an line sectional view which shows cross sectioned form of each part of a throwaway tip shown in FIG. 16.
FIG. 17(b) is an M—M line sectional view of FIG. 16.
Figure 18:
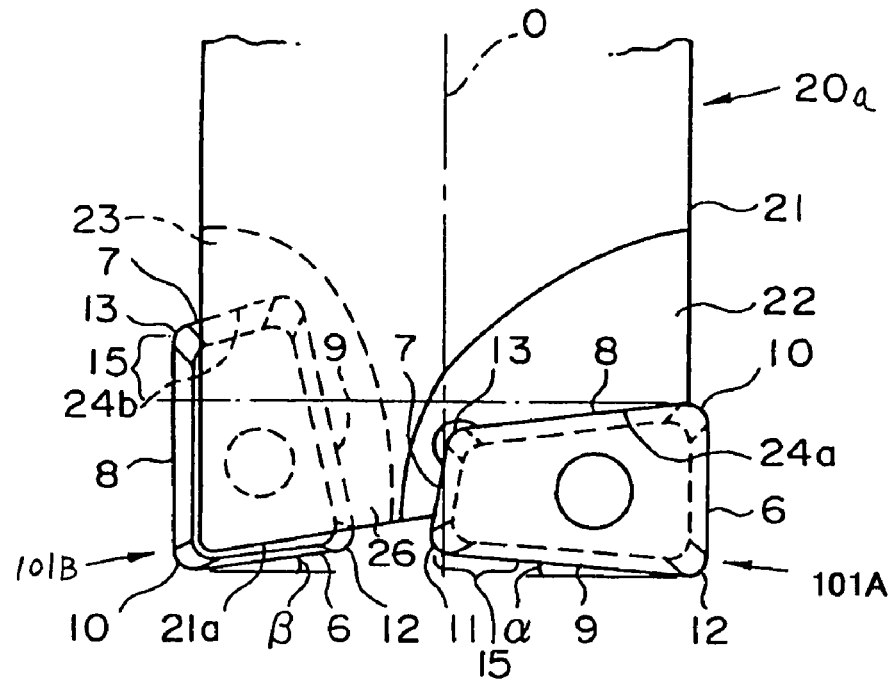
FIG. 18 is a principal part side view of an end mill shown in FIG. 16 to which two throwaway tips are mounted.
Figure 19:
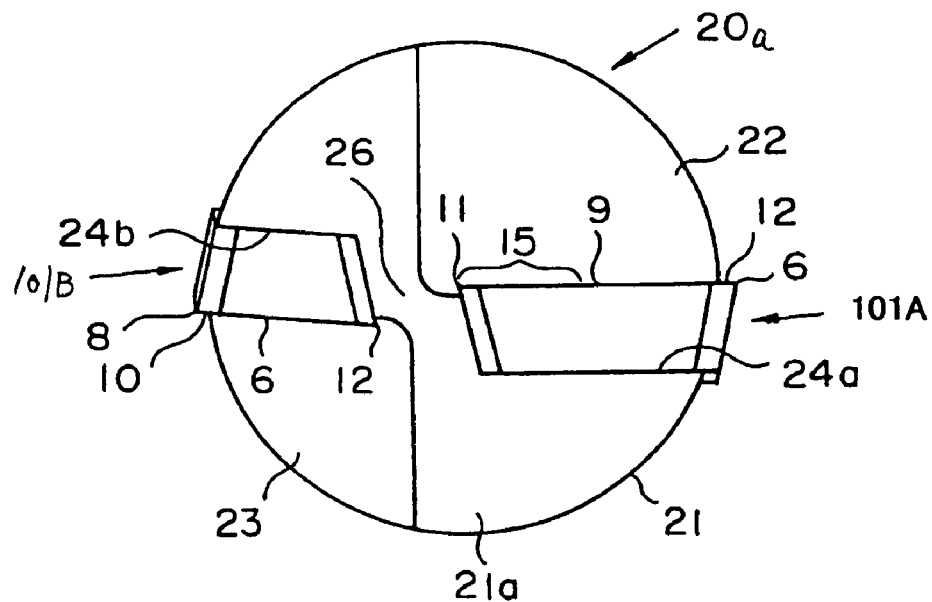
FIG. 19 is a front view of an end mill shown in FIG. 18.
Figure 20:
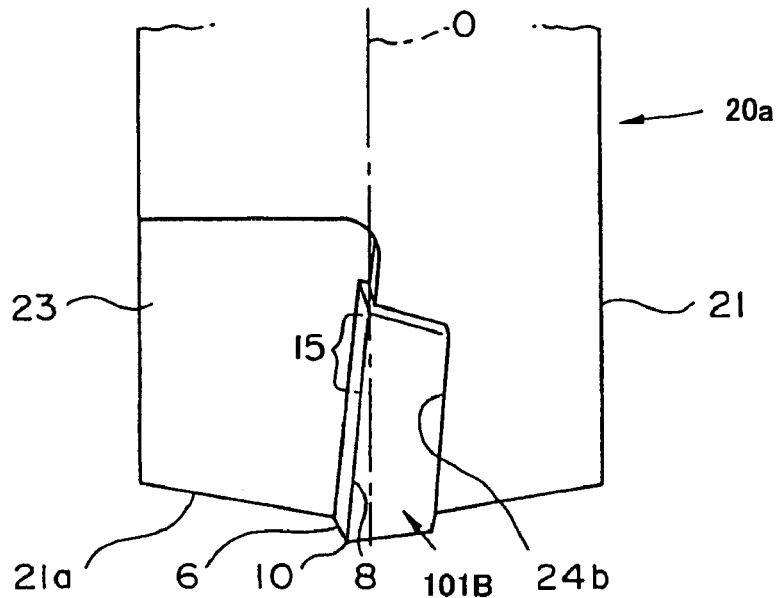
FIG. 20 is a side view of the end mill shown in FIG. 18, as seen of the direction of peripheral cutting edge.

[5th embodiment] although the throwaway tip and throwaway type end mill by the 5th embodiment of this invention are explained with the reference to a drawings, the explanation is omitted by using the same marks in a portion of the same or similar parts to each embodiment mentioned above. FIG. 16 and FIG. 17 show the throwaway tip by the 5th embodiment, and FIG. 18 to FIG. 20 show the throwaway type end mill by the 5th embodiment. FIG. 16 is a plan view of a throwaway tip, and FIG. 17 is a cross-sectional view of each part of the throwaway tip shown in FIG. 16. (a) is L—L line cross-sectional view in FIG. 16, (b) is M—M line cross-sectional view in FIG. 16. FIG. 18 is a principal part side view of end mill which equipped with the throwaway tip shown in FIG. 16, and FIG. 19 is a front view of end mill shown in FIG. 18, FIG. 20 a principal part side view which looked at the end mill shown in FIG. 18 from the perimeter tooth side. The throwaway tip (it may be hereafter called a tip) 101 by the embodiment shown in FIG. 16 and FIG. 17 is made into the shape of an approximately square plate like by which the arrangement and form of the under face 2, upper face, the four side face 4, insert hole 5 are made almost the same as the throwaway tip 1 by 1st embodiment. Moreover, in four edge side on a upper face 3 of a tip 101, a each pair of edge side which opposite each other, is made a short tooth and long tooth same as tip 1, one side of the cutting tooth of two tooth which constitutes a short tooth is taken as the first short tooth 6 which it is comparatively long, the other is made the second short tooth 7 which is comparatively short. The two side which opposite to the other which constitute the long tooth is made the first long tooth 8 and the second long tooth 9 which is longer than the first short tooth 6. And the first short tooth 6 and the second short tooth 7 which opposite each other is made non-parallel, and the first long tooth 8 and the second long tooth 9 which opposite each other is also made non-parallel. The upper face 3 is made into the rake face of each cutting tooth 6, 7, 8, 9, and the side face is made into the flank face. Moreover, in upper face 3, the land parts 14 which stands in a row in each cutting tooth is formed all over the circumferences. And, the first corner tooth 10 of one direction of a diagonal of the upper face 3 and the second corner tooth 11 is formed by crossing of the first short tooth 6 and the first long tooth 8, the second short tooth 7 and the second long tooth 9 respectively, and the third corner tooth 12 which consist of the first short tooth 6 and the second long tooth 9 of the another diagonal direction and the fourth corner tooth 13 which consist of the second short tooth 7 and the first long tooth 8 is formed. The corner angle of each corner tooth is made as the almost same corner angle as the tip 1 by the 1st embodiment respectively. In this throwaway tip 101, the part of fourth corner tooth 13 slippage of the first long tooth 8 and the part of the second corner tooth 11 slippage of the second long tooth 9, the strengthening part 15 is formed respectively. As shown in a sectional view of FIG. 17(*a*), the strengthening part 15 formed in the first long tooth 8 is constructed as that the rake angle γ 1 (the first rake angle) of a land part 14 in a portion of the fourth corner tooth 13 slippage in the first long tooth 8 and a rake angle γ 2 (the second rake angle) on a upper face 3 is made into a small angle than a rake angle γ 3 of a land part 14 in other part of the first long tooth 8 and a rake angle γ 4 on a upper face 3. (refer to the FIG. 17(*b*)). Similarly, in the second long tooth 9, the strengthening part 15 is constructed as that the rake angle γ 1 of a land part 14 in a part of the second corner tooth 11 slippage and a rake angle γ 2 of a upper face 3 is made into a small angle than the rake angle γ 3 of a land part 14 in other part of the second long tooth 9 and a rake angle γ 4 on a upper face 3. The strengthening part 15 makes an rake angle into an smaller angle than other parts, enlarges the thickness of the tooth and raises the strength of the cutting tooth in this portion.

Here, In this first long tooth 8 and the second long tooth 9, the first and the second rake angle in strengthened parts or parts other than a strengthened parts is good also as the same angle, and also let it be an angle different respectively. The throwaway tip 101 by this embodiment is constituted as mentioned above, the end mill 20*a* which equipped with two or more of this throwaway tip 101 is explained by FIG. 18 to FIG. 20. The end mill 20*a* consists of the almost same composition as end mill 20 by the first embodiment, the throwaway tip 101 by this embodiment is equipped on tip attachment seat 24*a*, 24*b* formed in a tip part of a main part 21 of a tool. And, the throwaway tip 101 mentioned above is equipped at one tip attachment seat 24 a of the main part 21 of a tool. The second long tooth 9 is projected to a tip side from the tip face 21*a* of a main part 21 of a tool as the front face. This tip is as 101A. In other tip attachment seat 24*b*, the throwaway tip 101 is equipped projecting the first short tooth 6 from the tip face 21*a* of a main part 21 of a tool as the front face tooth. This is as sub-tip 101B. (the arrangement of the main tip 101A and sub-tip 101B in end mill 20*a* by this embodiment is almost made same as the main tip 1A and sub-tip 1B in end mill 20 by the first embodiment shown in FIG. 18 to FIG. 20.)

With such arrangement construction, the strengthening part 15 of the second long tooth 9 which is a front face tooth of a main tip 101A is located in a circumference side in a front face tooth. Moreover, the strengthening part 15 of the first long tooth 8 which is perimeter tooth of sub-tip 101B is located in a base edge side of a tool in a perimeter tooth.

Since the throwaway tip 101 and end mill 20*a* in this embodiment is constructed as mentioned above, it can be possible to cut the work material like the throwaway tip 1 and end mill 20 by the first embodiment.

And, what is necessary to exchange the same throwaway tip 101 and just equip, even if the cutting tooth of one of the tips 101A and 101B is suffered a loss or worn out. Here, in conventional end mill, it is formed the overlapping part of rotation locus of perimeter tooth of two tips (the part becoming two number of tooth) and not overlapping part (the part becoming single tooth) in perimeter tooth of each throwaway tip when a main part of tool is rotated in a rotating axis line. And compared with the portion used as a two sheet edge, it is easy to damage the portion which serves as a single edge in a cutting tooth in response to strong cutting resistance at the time of cutting of work material.

In end mill 20*a* of this embodiment, in each cutting work, the first long tooth 8 which is perimeter tooth of sub-tip 101B is not overlap the locus of the first short tooth 6 which is perimeter tooth of main tip 101A, this portion will cut the work material as a single tooth.

And in portions other than this, although the perimeter tooth of both tips will cut the work materials as a two sheet edge, in these both tips, the strengthening part 15 is formed in a part of single edge, and is secured the strength of the cutting tooth of this portion. And in both tips, the selection of the shape of cutting tooth is not necessary in other portion, and it can be possible to decrease the drop of the sharpness by taking the shape of cutting tooth which the sharpness of cutting tooth is thought as important in this portion. According to throwaway tip 101 and end mill 20*a* which is constituted as this, in perimeter tooth of each tip 101, the strengthening part 15 is set in a portion of single tooth, as the results, the strength of cutting tooth is secured, and it is possible to do the shape of cutting tooth where the sharpness was thought as important in a portion of two cutting tooth, you may be possible to secure the strength of cutting tooth and to decrease the drop of the sharpness in a throwaway tip.

Figure 21:
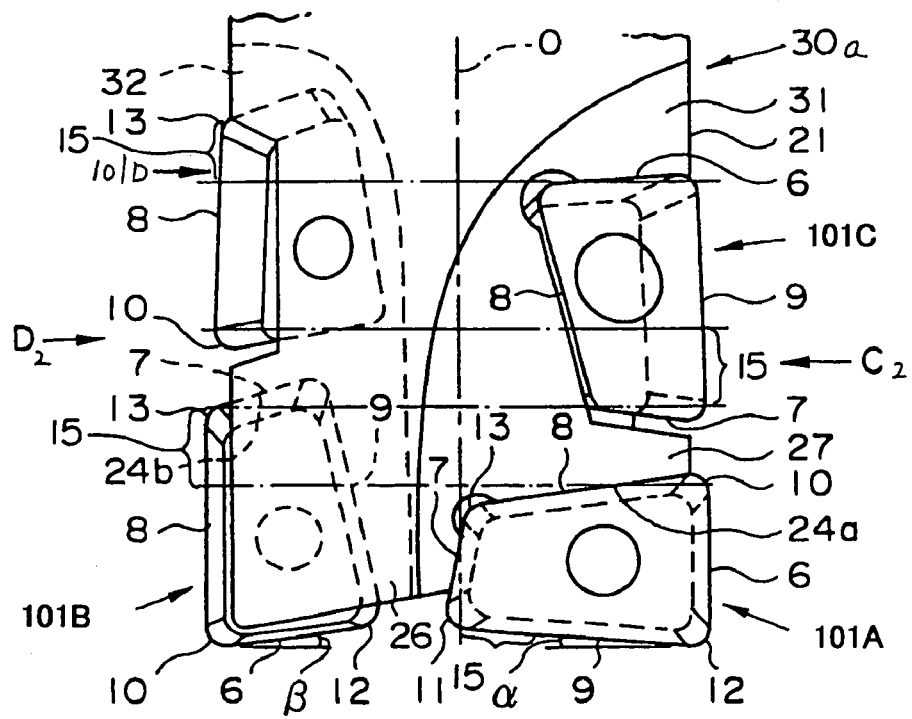
FIG. 21 is a side view of the end mill according to an 6th embodiment of the present invention
Figure 22:
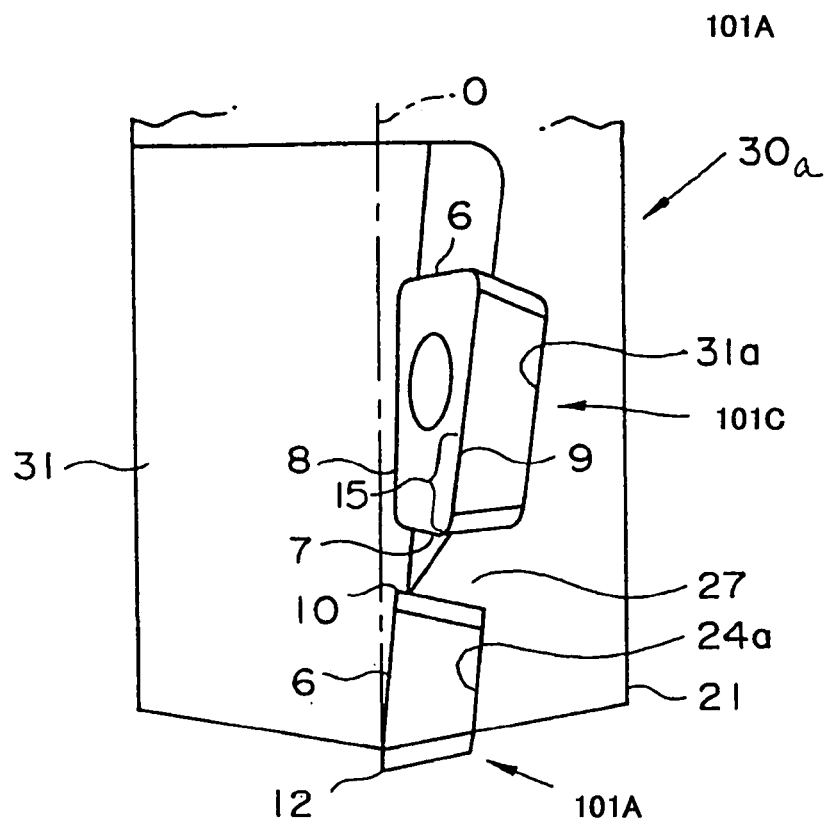
FIG. 22 is a side view of an end mill shown in FIG. 21, as seen from the direction of C2.
Figure 23:
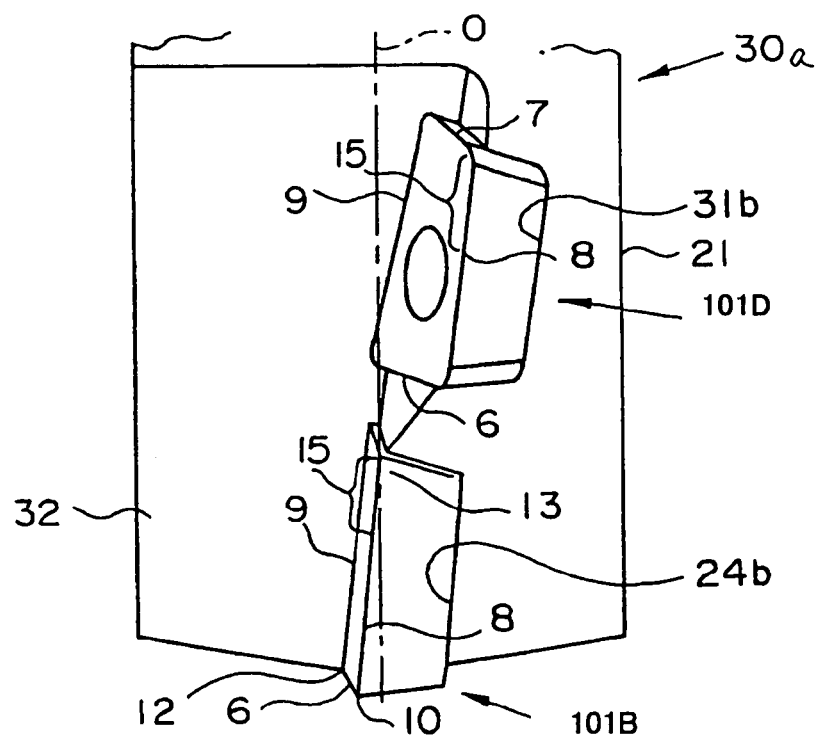
FIG. 23 is a side view of an end mill shown in FIG. 21, as seen from the direction of D2.

[the 6th embodiment] Although the 6th embodiment of this invention is explained by FIG. 21 to FIG. 23, the explanation is omitted using the same marks in a same or similar portion with each embodiments mentioned above. FIG. 21 is a side view of an throwaway type end mill by the 6th embodiment, FIG. 22 is a C2 direction side view of the end mill shown in FIG. 21, FIG. 23 is also C2 direction side views.

The throwaway type end mill 30*a* by the 6th embodiment shown in FIG. 21 to FIG. 23 is equipped with the same construction as throwaway type end 20*a* by the 5th embodiment, and in a tip portion of a main part 21 of a tool, two concave groove 31, 32 which the cross section is cut in approximately fan shape opposite to an rotation axis O which makes the rotation center. The tip attachment seat 24*a*, 24*b* are formed in the field where turn to the rotation direction in a tip side of each concave groove 31 and 32, the main tip 101A, sub-tip 101B is equipped respectively. The arrangement and construction of these tips 101A, 101B is the same with the 5th embodiment mentioned above. And the tip attachment seat 31*a* is further formed in the base edge side of a main tip 101A in the other concave groove, the throwaway tip 101 mentioned above is equipped as the third tip 101C. This third tip 101C is projected to the out side of radius direction from perimeter face of a main part 21 of a tool as the perimeter tooth of the second long tooth 9 and is located in parallel to the rotation axis O, and is located toward the second short tooth 7 in a tip side. With this arrangement composition, the strengthening portion 15 of the second long tooth 9 which is the perimeter tooth of the third tip 101C is located in a tip side of a tool in a perimeter tooth. Moreover, this second long tooth 9 is located in shifting to the base edge side from the first long tooth 8 as that it overlaps the rotation locus of the first long tooth 8 which makes the perimeter tooth of sub-tip 101B located opposite to the rotating axis O of a main part 21 of a tool. Next, in other concave groove, the attachment seat 31*b* is further formed in a base edge side of a sub-tip 101B, the throwaway tip 101 mentioned above is equipped as the fourth tip 101D. This fourth tip 101D is projected to out side of radius direction from perimeter face of a main part 21 of a tool as the perimeter tooth of the first long tooth 8, and is located in a parallel to the rotating axis O, and is arranged turning the short tooth 6 to the tip side. With this arrangement composition, the strengthening portion 15 of the first long tooth 8 which is the perimeter tooth of the fourth tip 101D is located in a base edge side of a tool in a perimeter tooth. Moreover, this first long tooth 8 is arranged shifting in a base edge side from this second long tooth 9 which overlaps with the rotating axis of the second long tooth 9 which makes the perimeter tooth of the third tip 101C located opposite to the rotating axis O of a main part 21 of a tool. Here, the arrangement of the tip 101A, 101B, 101C, 101D in end mill 30a by this embodiment is made almost the same as that of 101A, 101B, 101C, 101D in end mill 30 in the second embodiment.

In addition, the arrangement number of seats of a tip 101 is not necessarily for seats, you may arrange three or five or more seats. In case that the end mill 30a is used in each cutting, the base edge portion of tool of the first long tooth 8 which makes perimeter tooth in a sub-tip 101B and the tip portion of tool of the second long tooth 9 which makes perimeter tooth in a third tip 101C and base edge portion of a tool of the first long tooth 8 which makes perimeter tooth in a fourth tip 101D are not overlap with the locus of perimeter of other tip respectively, and this portion will cut work material as a single tooth respectively. And in perimeter tooth of each tip, the other portion will cut the work material as a two sheet tooth.

Here, in each tip, the strengthening portion is formed in the portion used as single tooth, and the strength of this portion is secured. And since other portions do not need to add restriction to cutting tooth shape in each tip, a fall of sharpness can be reduced as cutting tooth shape where sharpness was thought as important.

According to the end mill 30a by this 6th embodiment, the drop of the sharpness can be reduced, securing the the strength of cutting tooth of a throwaway tip, since it can consider as the cutting tooth shape where sharpness was thought as important in the portion used as a two sheet tooth locating the strengthening part 15 in the portion used as a single tooth in the perimeter tooth of each throwaway tip 101.

Figure 24:
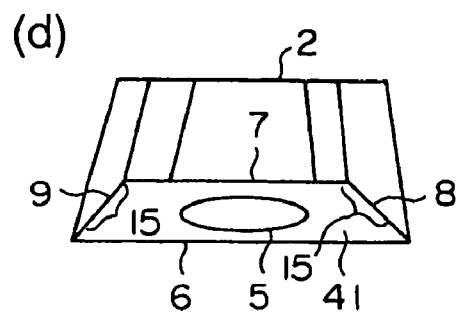
FIG. 24(a) is a plan view of the throwaway tip according to the 7th embodiment of the present invention.
FIG. 24(b) is a side view of the tip shown in FIG. 24(a), as seen from the direction of E2.
FIG. 24(c) is a side view of the tip shown in FIG. 24(a), as seen from the direction of F2.
FIG. 24(d) is a side view of the tip shown in FIG. 24(a), as seen from the direction of G2.
Figure 24:
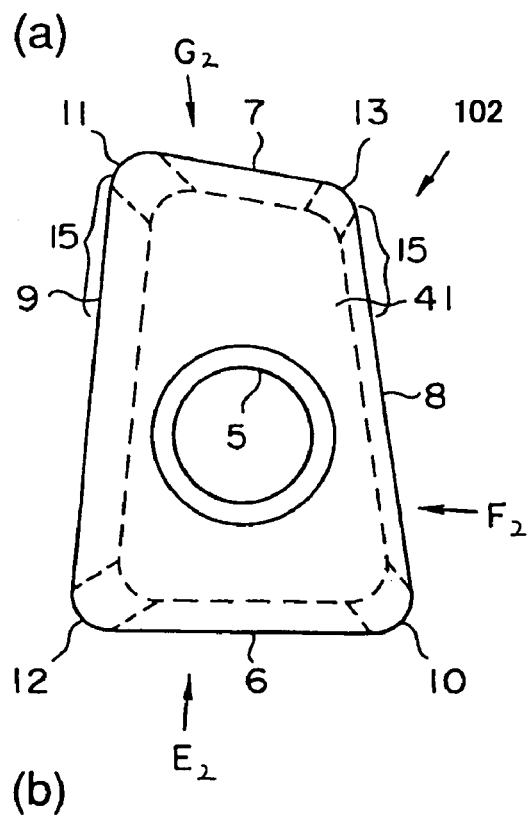
Figure 24:
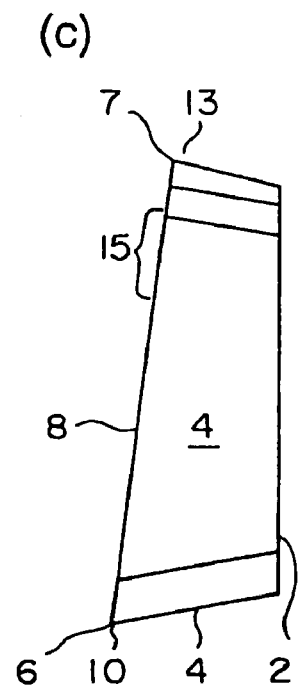
Figure 24:
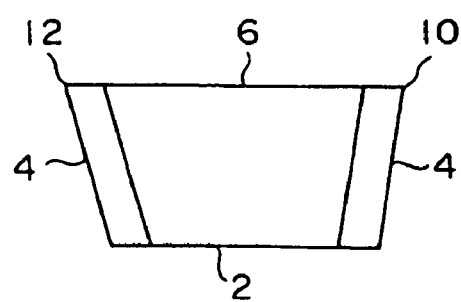

[The 7th embodiment] The another embodiment of the throwaway tip in this invention is explained in FIG. 24 as the 7th embodiment, it is explained by using the same mark about the same or similar portion with the throwaway tip in above mentioned each embodiments.

FIG. 24(*a*) is a plan view of the throwaway tip by this embodiment, (b) is the E2 direction side view of the throwaway tip shown in (a), (c) is the F2 direction side view similarly, (d) is the G2 direction side view similarly. The throwaway tip 102 by the 7th embodiment shown in FIG. 24 (it may be hereafter called a tip) is made into the shape of approximately square plate late, and the upper face 41 which counters the under face 2 which is the seat face is formed to the plane like inclined so that the distance with the under face 2 may become small gradually towards the second short tooth 7, and therefore, the first long tooth 8 and the second long tooth 9 become linear like tooth from the first short tooth 6 toward the second short tooth 7. Therefore, in the second short tooth 7, the distance with the under face 2 is formed to the smallest. Moreover, the penetrated hole 5 which penetrates the vertical sides 2 and 41 is punched in the direction which carries out an almost rectangular cross on the under face 2. Or you may it intersect perpendicularly with the upper face 41. Properly, the strengthening portion 15 is constructed in a 4th corner tooth 13 slippage of the first long tooth 8 and a 2nd corner tooth 11 slippage of the second long tooth 9 in this throwaway tip 102. In case that this throwaway tip 102 is equipped in an end mill 30a (20) mentioned above in place of tip 101, if it is equipped not changing the radial rake angle and axial rake angle of each tooth of each tip 102, it can be possible to enlarge the thickness of tip attaching seat 24a, 24b, 31a, 32a, of the back face of tip, and the strength of tooth of a main part 21 of a tool can be improved.

Figure 25:
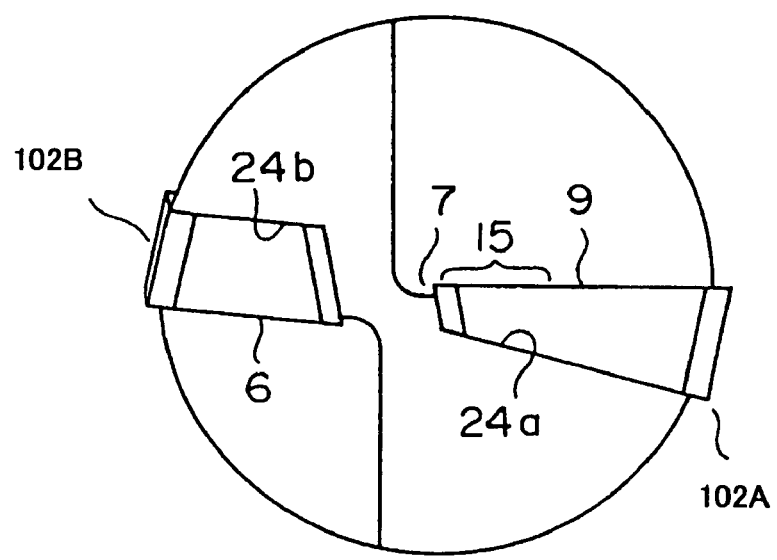
FIG. 25 is a front view of an end mill shown in FIG. 24 to which the throwaway tip is mounted.
Figure 26:
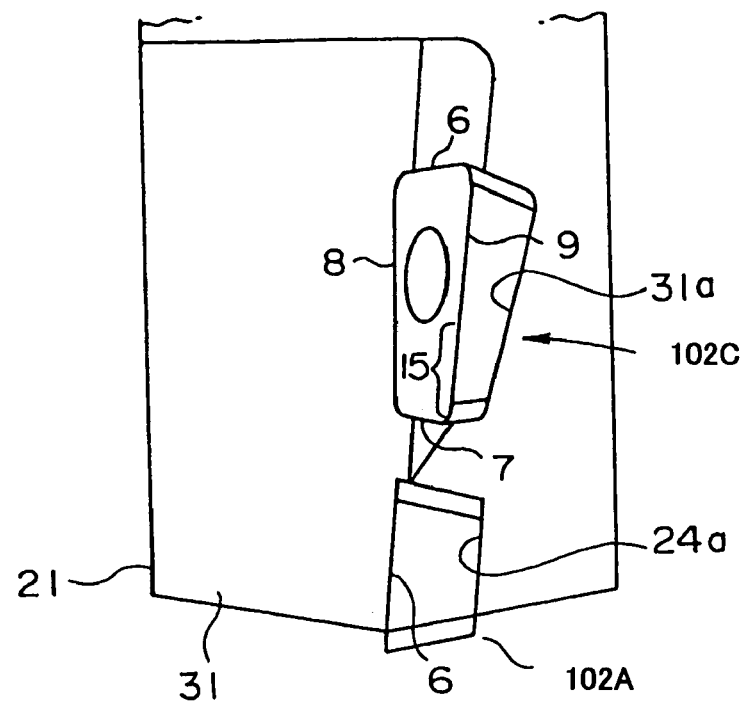
FIG. 26 is a side view of an end mill shown in FIG. 25, as seen from the direction of one outer peripheral cutting edge.
Figure 27:
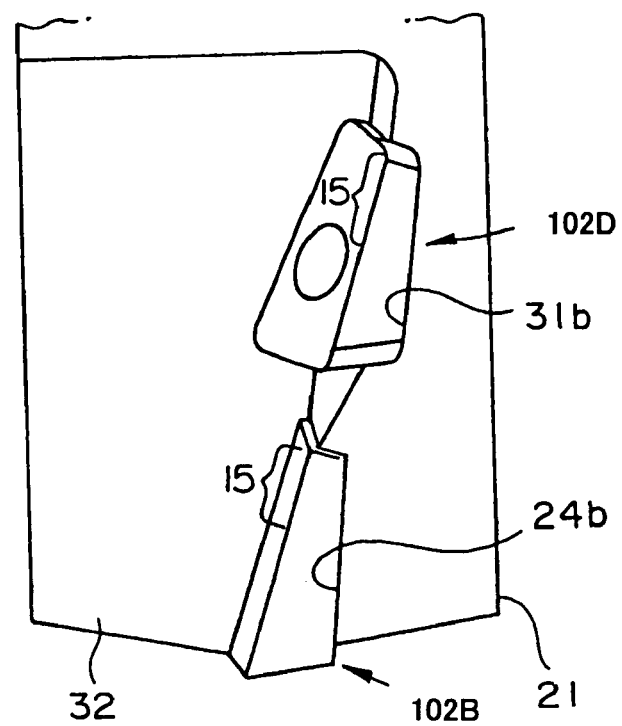
FIG. 27 is a side view of an end mill shown in FIG. 25, as seen from the direction of the other outer peripheral cutting tooth

In main tip 102A shown in FIG. 25 and the third tip 102C shown in FIG. 26, the thickness of the second short tooth 7 side of tip attaching seat 24a, 31a can be thickened. Moreover, in case that it is equipped on attaching seat not changing the style of seat face (under face 2) of tip 102 or 1, as shown in FIG. 27, the axial rake angle of the first long tooth 8 which is each perimeter tooth can be enlarged in sub-tip 102B and the 4th tip 102D which the first short tooth 6 is located in a tip portion side, and the sharpness of perimeter cutting can be improved.

Figure 28:
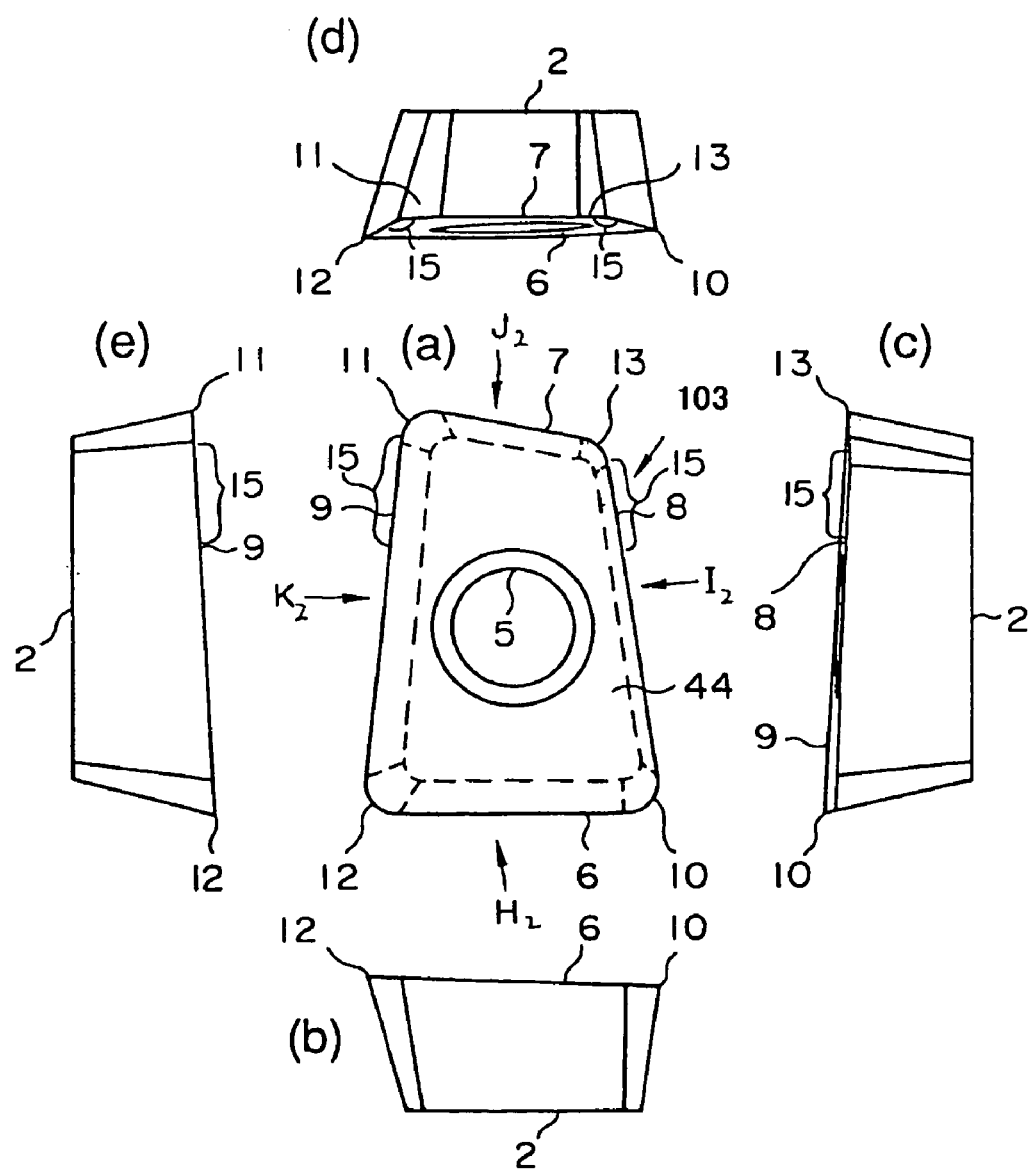
FIG. 28(a) is a plan view of a throwaway tip according to a modification of the 7th embodiment.
FIG. 28(b) is a side view of a tip shown in FIG. 28(a), as seen from the direction of H2.
FIG. 28(c) is a side view of a tip shown in FIG. 28(a), as seen from the direction of I2.
FIG. 28(d) is a side view of a tip shown in FIG. 28(a), as seen from the direction of J2.
FIG. 28(e) is a side view of a tip shown in FIG. 28(a), as seen from the direction of K2.

You may have the composition shown in FIG. 28 as a modification of a tip 102 by the 7th embodiment. FIG. 28(*a*) is a plan view of the throwaway tip by this embodiment, (b) is a H2 direction side view of the throwaway tip shown in (a, (c) is a I2 direction side view similarly, (d) is J2 direction side view similarly, (e) is K2 direction side view similarly.

The throwaway tip 103 by the modification shown in FIG. 28 is made into approximately square plate late, and the upper face 44 which opposite to under face 2 which makes seat face is formed in the twist face, therefore, the 1 st short tooth 6, the 2nd short tooth 7, the 1 st long tooth 8 and the 2nd long tooth 9 are the cutting tooth of the shape of a straight line which inclines at respectively voluntary angles so that the distance with the under face 2 may change gradually from the end of a corner tooth towards the other corner edge respectively. Moreover, the penetrating hole 5 which penetrate the vertical face 2, 44 is punched in a direction of approximately rectangular cross on the under face 2. Or you may make it intersect perpendicularly with the upper face 44. If such composition is adopted, according to the attachment position and style of each cutting tooth, a suitable radial rake angle and a axial rake angle can be set up.

In addition, you may establish a breaker slot in the upper face 3, 41, 44. Moreover, the each front face tooth of two sheets of tip 101, 101 (102, 102; 103, 103) may be arranged in the position of core going up or core going down. Moreover, in a tip 101, 102, 103 by the 5th and the 7th embodiment, the corner angle of the 1 st and three corner tooth 10, 11, 12 of an acute angle is the same or may not be the same. In addition, in each throwaway tip 101, 102, 103 by the 5th and the 7th embodiment, and modification, each long tooth 8, 9, short tooth 6, 7 made into straight like, in replace of this, convex curved like or concave curved like may be good also, in this case, the upper face 41, 44 may be sufficient as a convex curved face or concave curved face. Moreover, various cutting tools such as other kind of milling tool, cutting tool by lathe can also be equipped with the throwaway tip by this invention without being limited to end mill 30a.

Figure 29:
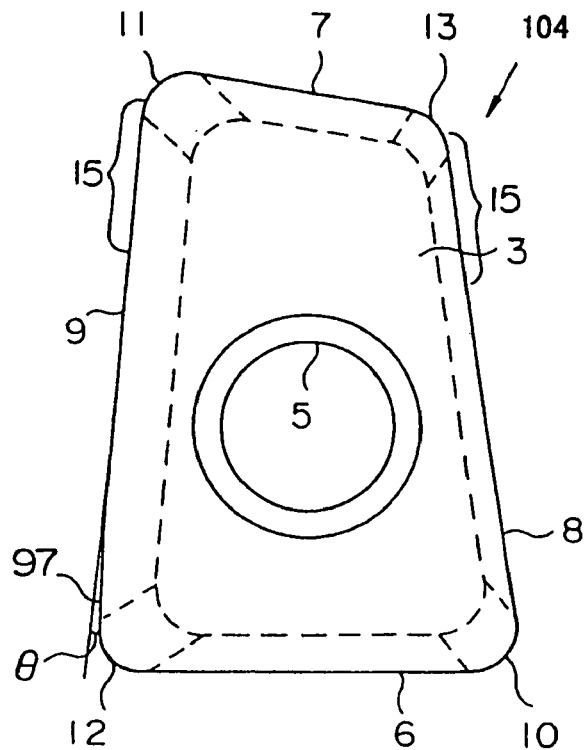
FIG. 29 is a front view of a throwaway tip according to the 8th embodiment of the present invention.
Figure 30:
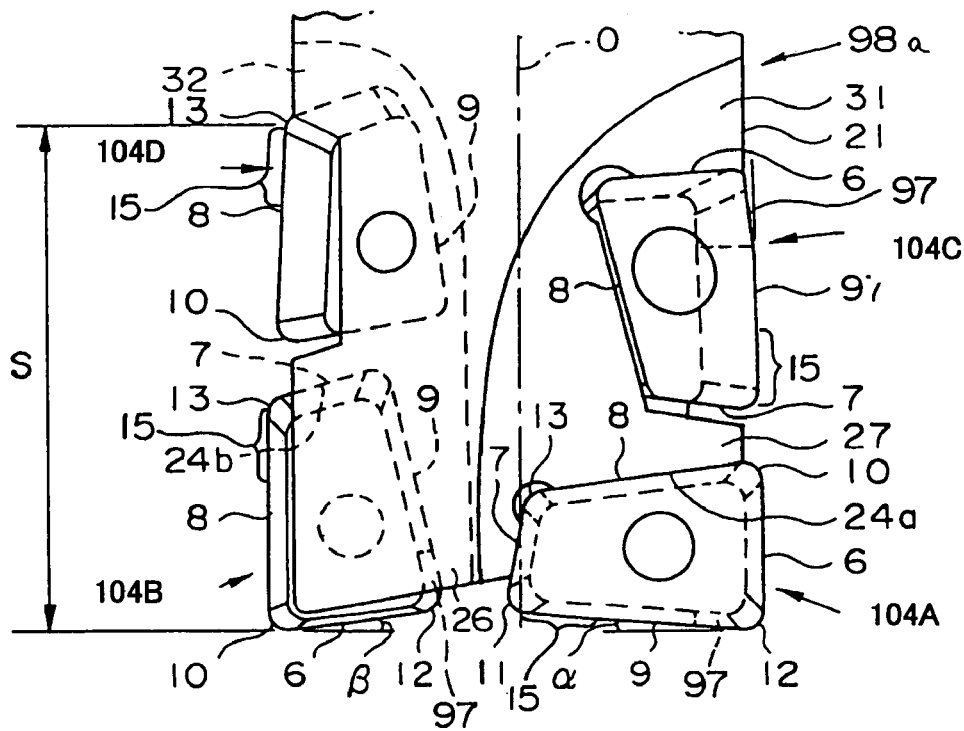
FIG. 30 is a side view of an end mill according to the 8th embodiment of the present invention.

[the 8th embodiment] The 8th embodiment in this invention is explained by using FIG. 29 and FIG. 30, the explanation is omitted by using the same mark in same or similar portion with the 6th embodiment mentioned above. FIG. 29 is a plan view of the throwaway tip by the 8 th embodiment, FIG. 30 is the side view of throwaway type end mill by the 8th embodiment. In the throwaway tip 101 by the 5th embodiment shown in FIG. 16, the throwaway tip 104 shown in FIG. 29 is the one that the sub-cutting tooth 97 which inclines so as to retreat inside of the face 3 of 1 as it approaches the third corner tooth 12 is formed in a edge portion including the third corner tooth 12 of the second long tooth 9.

The sub-cutting tooth 97 inclines at the angle θ (for example, θ=5°) to the other portion of the second long tooth 9. The throwaway type end mill 98*a* by the 8th embodiment is the same composition with the throwaway type end mill 30*a* by the 6th embodiment mentioned above, the tip 104 is arranged in replace of tip 101. In a tip portion of a main part 21 of a tool, two concave grooves 31, 32 which is cut in approximately fan shape of cross-section opposite to rotation axis O which makes the rotation center.

The tip attachment seat 24*a*, 24*b* is formed in the face of rotation direction in a tip side of each concave grooves 31, 32, the main tip 104A and sub-tip 104B is equipped respectively. The arrangement composition of these tip 104A, 104B is the same that of the tip 101A, 101B by the 6th embodiment mentioned above. And, In the arrangement composition mentioned above, the sub-cutting tooth 97 which is formed to the second long tooth 9 of the tip 104A is projected to the tip side of a main part 21 of a tool than the other portion of the second long tooth 9. Moreover, the second long tooth 9 of the tip 104B is located inner circumference side of a main part 21 of a tool, and becomes not acting on cutting. And the tip attachment seat 31*a* is also formed in the base edge side of a main tip 104A in the other concave groove 31, the throwaway tip 104 mentioned above is equipped as the third tip 104C. This third tip 104C uses the second long tooth 9 as a perimeter tooth, and it project to out side of radius direction from the perimeter face of a main part 21 of a tool, and located almost parallel to rotation axis O, and the second short tooth 7 is arranged towards tip side. In this arrangement composition, the sub-cutting tooth 97 which formed in the third tip 104C is escaped to the inner side of the main part 21 of tool to the other portion of the second long tooth 9. Next, in the other concave groove 32, the tip attaching seat 31*b* is also formed in a base edge side of sub-tip 104B, and the throwaway tip 104 mentioned above is equipped as the 4th tip 104D. This 4th tip 104D uses the 1 st long tooth 8 as perimeter tooth, and it projects to out side of radius direction from perimeter face of a main part 21 of a tool, and located in almost parallel to the rotation axis O, and the 1 st short tooth 6 is arranged towards tip side. In this arrangement composition, the second long tooth 9 of the tip 104D is located in the inner circumference side of a main part 21 of a tool don't act on a cutting. According to the end mill 98*a* by this 8th embodiment, the sub-cutting tooth 97 of a tip 104A can be used as a finish cutting in a throwaway tip 104, the sub-cutting tooth 97 in other tip 104B, 104C, 104D don't act in cutting of work material. Thus, in end mill 98*a*, since the proceeding of wear of sub-cutting tooth 97 is restricted except the case that the second long tooth 9 is used as front face tooth, the sharpness of sub-cutting tooth 97 in throwaway tip 104 can be secured, when it was done the finish machining of work material by sub-cutting tooth 97 as the front face tooth, it can be acquired a good finished surface. Moreover in tip 104D which located in the most base edge side of a main part 21 of a tool, since the first long tooth 8 not forming the sub-cutting tooth 97 is used as a perimeter tooth, the maximum depth of cut S of throwaway type cutting tool can be secured, forming sub-cutting tooth 97 in second long tooth 9. In addition, the arrangement number of sheets is not necessarily four sheets, you may arrange three or more than five sheets. Moreover, in the 8th embodiment mentioned above, the sub-cutting tooth 97 is constructed to the second long tooth 9 in throwaway tip 101 by the 5th embodiment shown in FIG. 16, however, for example, the sub-cutting tooth 97 is formed to the second long tooth 9 in either not only of this but the throwaway tip 102 or 103. Moreover, the throwaway tip 104 may be not only equipped with end mill 98*a* but also other end mill.

Figure 31:
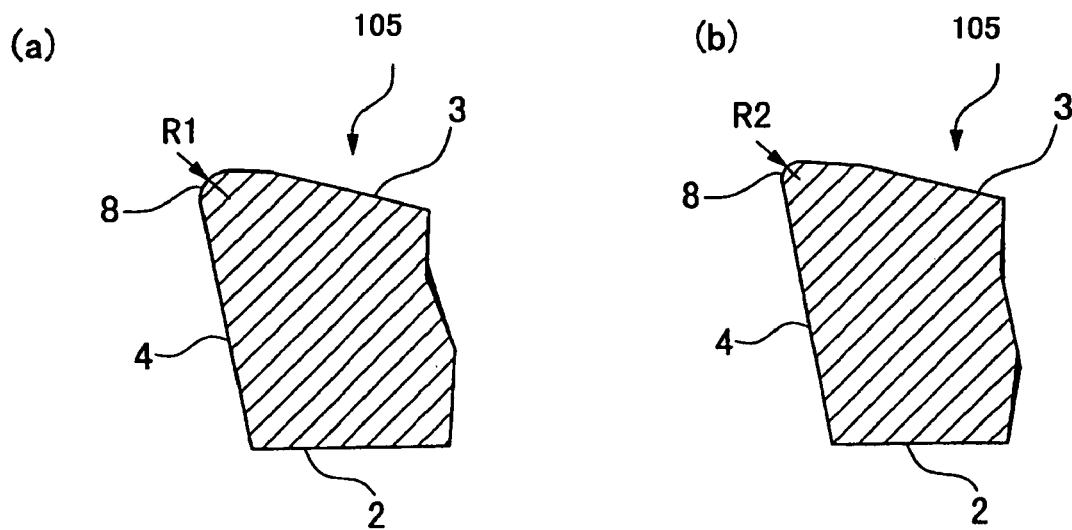
FIG. 31 is a sectional view which shows sectional form of each part of throwaway tip according to the 9th embodiment of the present invention.

[the 9th embodiment] the 9th embodiment of the throwaway tip in this invention as another example is shown in FIG. 31, it is explained by using the same mark in a same or similar portion with the throwaway tip 101 by the 5th embodiment. FIG. 31 is a sectional view showing the cross-sectioned form of each portion of throwaway tip in this embodiment, (a) is a sectional view corresponding to L—L line sectioned view of throwaway tip by the 5th embodiment, (b) is a sectional view corresponding to M—M line sectioned view of throwaway tip by the 5th embodiment. The throwaway tip 105 (hereinafter, may be called as a tip) by the 9th embodiment shown in FIG. 31 has an almost same shape with that of the throwaway tip 101 shown in FIG. 16, the circle honing is given in each cutting tooth. And it differs to the throwaway tip 101, the strengthening portion 15 of the first and second long tooth 8, 9 is not made as small the rake angle to other portion, made as the following compositions.

Figure 32:
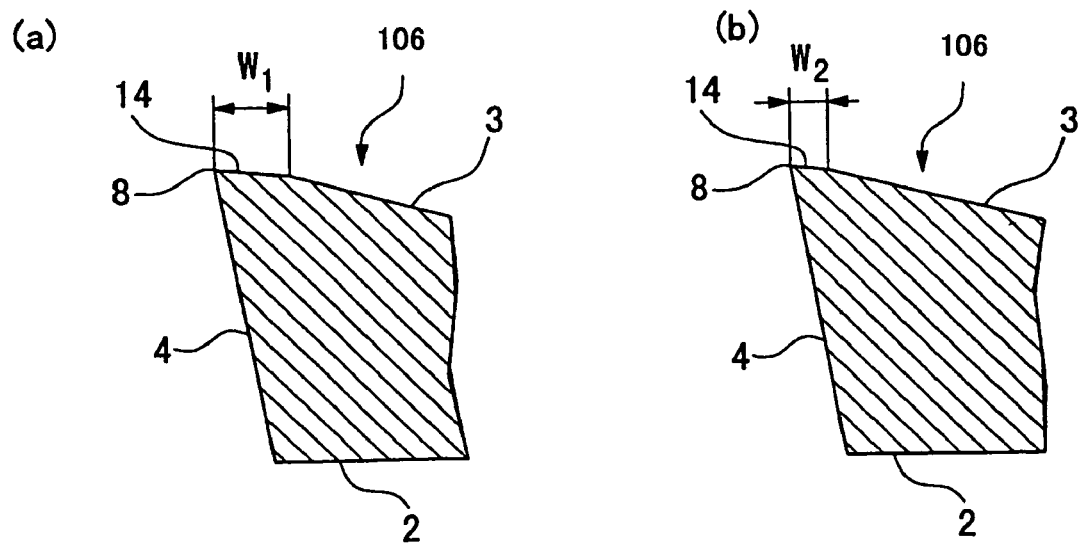
FIG. 32 is a sectional view which shows sectional form of each part of the throwaway tip according to 10 the embodiment of the present invention.

Namely, the strengthening portion 15 of first long tooth 8 is constructed as follows, as shown in a section view of FIG. 31, the curvature radius R1 of the tip of tooth portion of second corner tooth 11 slippage in the first long tooth 8 is made larger than that R2 of the other portion of the first long tooth 8 (refer to FIG. 31(*b*)). Similarly, the strengthening portion 15 in the second long tooth 9 is also constructed so that the curvature radius of a tip of tooth of the 4th corner tooth slippage R1 is made larger than that R2 of other portion of the 1 st long tooth 8 (not shown in figure). The strengthening portion 15 is taking the curvature radius of the tip of the tooth larger than other portions, raises the cutting strength of this portion. Here, the curvature radius R1 of the strengthening portion 15 comrades or the curvature radius R2 of other than strengthening portion 15 is good also as the same with the first long tooth 8 and the second long tooth 9 and it can also consider as a curvature radius different, respectively. [the 10th embodiment] The 10th embodiment of the throwaway tip in this invention as another example is shown in FIG. 32, it is explained by using the same mark about the same or similar portion with the throwaway tip 101 by the 5th embodiment. FIG. 32 is a sectional view showing the cross-sectioned form of each portion of throwaway tip in this embodiment, (a) is a sectional view corresponding to L—L line sectioned view of the throwaway tip by 5th embodiment, (b) is a sectional view corresponding to M—M line sectioned view of the throwaway tip by the 5th embodiment. The throwaway tip 106 (hereinafter may be called as a tip) by the 10th embodiment shown in FIG. 32 is the almost same as that of the throwaway tip 101 shown in FIG. 16. And it differs in the throwaway tip 101, the strengthening portion 15 of the 1 st, 2nd long tooth 8, 9 is not made the rake angle to the other portion small, but considers as the as the compositions which is described below. Namely, as shown in a sectional view of FIG. 32(*a*), the width W1 of land portion 14 of the 2 nd corner tooth 11 slippage in the 1 st long tooth 8 is made larger than that W2 (refer to FIG. 25(*b*)) of the land part 14 of the other portion of the 1st long tooth 8. Similarly, in the second long tooth 9, the strengthening portion 15 is constructed as that the width W1 of land part 14 of the 4th corner tooth 13 slippage is made larger than that W2 of land part 14 of other portion of the 1 st long tooth 8 (not shown in figure). The strengthening portion 15 is taking the width W1 of the land part 14 larger than other portions, and raises the strength of the cutting tooth of this portion. Here, The width W1 of the land part 14 in each strengthening portion 15 with the 1 st long tooth 8 and 2nd long tooth 9 is made the same to the width W2 of land part 14 of the other portion than the strengthening portion 15, or it can also consider as width different, respectively. In addition, in tip 102, 103, 104 by the 7th, 8th embodiment mentioned above, the example which formed the strengthening portion 15 by the same composition with the strengthening portion 15 of the throwaway tip 101 shown in the 5th embodiment, however, without being restricted to this, the composition of the strengthening portion 15 is good also as which composition of the throwaway tip 101, 105, 106 shown in the 5th, the 9th, the 10th embodiment, and is good also as what combined these composition. This invention is not limited to each embodiments mentioned above, and includes the various modifications also including the combination of each embodiment mentioned above.

What is claimed is:

1. A cutting tool comprising:
   a tool body having a distal end; and
   a plurality of tips mounted to the distal end of the tool body, each tip of the plurality of tips comprising a plate of substantially quadrilateral shape, the plate having a first corner having a corner angle of less than 90° and an adjacent second corner having a corner angle of less than 90°, wherein at least one of the first corner and the second corner is arranged to project along an outer periphery of the distal end of the tool body, wherein:
   each tip of the plurality of tips has two opposing cutting edges defined as long cutting edges and another two opposing cutting edges defined as short cutting edges;
   one of the long cutting edges in a first of the plurality of tips projecting towards the distal end of the tool body is defined as a first front peripheral cutting edge and one of the short cutting edges in the first of the plurality of tips is defined as a first outer peripheral cutting edge; and
   one of the short cutting edges in a second of the plurality of tips projecting towards the distal end of the tool body is defined as a second front peripheral cutting edge and one of the long cutting edges in the second of the plurality of tips is defined as a second outer peripheral cutting edge.

2. The cutting tool of claim 1, wherein the first and second outer peripheral cutting edges are oriented such that rotation paths of the first and second outer peripheral cutting edges overlap when the tool body is rotated around a rotation axis.

3. A tip comprising a first edge corner having a corner angle of less than 90°, and an adjacent second edge corner having a corner angle of less than 90°, wherein the tip is formed of a substantially quadrilateral-shaped plate, and wherein said tip includes at least one edge corner having a corner angle of greater than 90°, wherein:
   said first edge corner is defined by a first cutting edge and a second cutting edge;
   said first cutting edge includes a main cutting tooth portion and a sub-cutting tooth portion;
   said sub-cutting tooth portion is provided adjacent a joint between said first cutting edge and said second cutting edge;
   said sub-cutting tooth portion is slightly inclined with respect to main cutting tooth portion; and
   wherein said corner angle of said first edge corner is defined as an angle between said main cutting tooth portion of said first cutting edge and said second cutting edge.

4. A cutting tool comprising:
   a tool body having a distal end; and
   a plurality of tips mounted to the distal end of the tool body, each tip of the plurality of tips comprising a plate of substantially quadrilateral shape, the plate having a first corner having a corner angle of less than 90° and an adjacent second corner having a corner angle of less than 90°, wherein at least one of the first corner and the second corner is arranged to project along an outer periphery of the distal end of the tool body, wherein:
   said first corner is defined by a first cutting edge and a second cutting edge;
   said first cutting edge includes a main cutting tooth portion and a sub-cutting tooth portion;
   said sub-cutting tooth portion is provided adjacent a joint between said first cutting edge and said second cutting edge;
   said sub-cutting tooth portion is slightly inclined with respect to main cutting tooth portion; and
   wherein said corner angle of said first corner is defined as an angle between said main cutting tooth portion of said first cutting edge and said second cutting edge.

5. A cutting tool comprising:
   a tool body having a distal end; and
   a plurality of tips mounted to the distal end of the tool body, each tip of the plurality of tips comprising a plate of substantially quadrilateral shape, the plate having a first corner having a corner angle of less than 90° and an adjacent second corner having a corner angle of less than 90°, wherein at least one of the first corner and the second corner is arranged to project along an outer periphery of the distal end of the tool body, wherein:
   said tool body has an axis of rotation;
   said plurality of tips comprises a first tip, a second tip, a third tip, and a fourth tip;
   said first tip and said third tip are provided within a first groove on said tool body, said first tip and said third tip being provided at different locations along the axis of rotation, said first tip and said third tip being spaced apart along the axis of rotation; and
   said second tip and said fourth tip are provided within a second groove on said tool body, said second tip and said fourth tip being provided at different locations along the axis of rotation, said second tip and fourth tip being spaced apart along the axis of rotation.

6. The cutting tool of claim 5, wherein:
   said first tip has a first outer peripheral cutting edge and the second tip has a second outer peripheral cutting edge, said first outer peripheral cutting edge and said second outer peripheral cutting edge are oriented such that rotation paths of said first outer peripheral cutting edge and said second outer peripheral cutting edge overlap when said tool body is rotated around the rotation axis;
   said third tip has a third outer peripheral cutting edge and the fourth tip has a fourth outer peripheral cutting edge, said third outer peripheral cutting edge and said fourth outer peripheral cutting edge are oriented such that rotation paths of said third outer peripheral cutting edge and said fourth outer peripheral cutting edge overlap when said tool body is rotated around the rotation axis;
   a first space provided between said first outer peripheral cutting edge and said third outer peripheral cutting edge, said first space being oriented such that a rotation path of at least one of said second outer peripheral cutting edge and said fourth outer peripheral cutting edge overlap with said first space when said tool body is rotated around the rotation axis;

a second space is provided between said second outer peripheral cutting edge and said fourth outer peripheral cutting edge, said second space being oriented such that a rotation path of at least one of said first outer peripheral cutting edge and said third outer peripheral cutting edge overlap with said second space when said tool body is rotated around the rotation axis.

7. A tip comprising a substantially planar plate including a first edge corner having a corner angle of less than 90°, and an adjacent second edge corner having a corner angle of less than 90°, wherein the plate includes at least one edge corner having a corner angle of greater than 90°, wherein:

said first edge corner is defined by a first cutting edge and a second cutting edge;

said first cutting edge includes a main cutting tooth portion and a sub-cutting tooth portion;

said sub-cutting tooth portion is provided adjacent a joint between said first cutting edge and said second cutting edge;

said sub-cutting tooth portion is slightly inclined with respect to main cutting tooth portion; and wherein said corner angle of said first edge corner is defined as an angle between said main cutting tooth portion of said first cutting edge and said second cutting edge.

8. A cutting tool comprising:

a tool body having a distal end;

a first tip mounted to the distal end of the tool body, said first tip comprising a substantially planar plate including a first edge corner having a corner angle of less than 90°, and an adjacent second edge corner having a corner angle of less than 90°, wherein at least one of the first edge corner and the second edge corner is arranged along an outer periphery of the distal end of the tool body;

a second tip mounted to the distal end of the tool body, said second tip comprising a plate including a first edge corner having a corner angle of less than 90°, and an adjacent second edge corner having a corner angle of less than 90°, wherein at least one of the first edge corner and the second edge corner of said second tip is arranged along the outer periphery of the distal end of the tool body;

a third tip mounted to the distal end of the tool body, said third tip comprising a plate including a first edge corner having a corner angle of less than 90°, and an adjacent second edge corner having a corner angle of less than 90°, wherein at least one of the first edge corner and the second edge corner of said third tip is arranged along the outer periphery of the distal end of the tool body; and a fourth tip mounted to the distal end of the tool body, said fourth tip comprising a plate including a first edge corner having a corner angle of less than 90°, and an adjacent second edge corner having a corner angle of less than 90°, wherein at least one of the first edge corner and the second edge corner of said fourth tip is arranged along the outer periphery of the distal end of the tool body, wherein:

each tip of said first tip, said second tip, said third tip, and said fourth tip have two opposing cutting edges defined as long cutting edges and another two opposing cutting edges defined as short cutting edges;

one of said long cutting edges of said first tip extends along the outer periphery;

one of said short cutting edges of said second tip extends along the outer periphery;

one of said long cutting edges of said third tip extends along the outer periphery; and one of said long cutting edges of said fourth tip extends along the outer periphery.

9. A cutting tool comprising:

a tool body having a distal end;

a first tip mounted to the distal end of the tool body, said first tip comprising a substantially planar plate including a first edge corner having a corner angle of less than 90°0, and an adjacent second edge corner having a corner angle of less than 90°, wherein at least one of the first edge corner and the second edge corner is arranged along an outer periphery of the distal end of the tool body;

a second tip mounted to the distal end of the tool body, said second tip comprising a plate including a first edge corner having a corner angle of less than 90°, and an adjacent second edge corner having a corner angle of less than 90°, wherein at least one of the first edge corner and the second edge corner of said second tip is arranged along the outer periphery of the distal end of the tool body;

a third tip mounted to the distal end of the tool body, said third tip comprising a plate including a first edge corner having a corner angle of less than 90°, and an adjacent second edge corner having a corner angle of less than 90°, wherein at least one of the first edge corner and the second edge corner of said third tip is arranged along the outer periphery of the distal end of the tool body; and a fourth tip mounted to the distal end of the tool body, said fourth tip comprising a plate including a first edge corner having a corner angle of less than 90°, and an adjacent second edge corner having a corner angle of less than 90°, wherein at least one of the first edge corner and the second edge corner of said fourth tip is arranged along the outer periphery of the distal end of the tool body, wherein:

said tool body has an axis of rotation;

said first tip and said third tip are provided within a first groove on said tool body, said first tip and said third tip being provided at different locations along the axis of rotation, said first tip and said third tip being spaced apart along the axis of rotation; and said second tip and said fourth tip are provided within a second groove on said tool body, said second tip and said fourth tip being provided at different locations along the axis of rotation, said second tip and fourth tip being spaced apart along the axis of rotation.

10. The cutting tool of claim 9, wherein:

said first tip has a first outer peripheral cutting edge and the second tip has a second outer peripheral cutting edge, said first outer peripheral cutting edge and said second outer peripheral cutting edge are oriented such that rotation paths of said first outer peripheral cutting edge and said second outer peripheral cutting edge overlap when said tool body is rotated around the rotation axis;

said third tip has a third outer peripheral cutting edge and the fourth tip has a fourth outer peripheral cutting edge, said third outer peripheral cutting edge and said fourth outer peripheral cutting edge are oriented such that rotation paths of said third outer peripheral cutting edge and said fourth outer peripheral cutting edge overlap when said tool body is rotated around the rotation axis;

a first space provided between said first outer peripheral cutting edge and said third outer peripheral cutting edge, said first space being oriented such that a rotation path of at least one of said second outer peripheral cutting edge and said fourth outer peripheral cutting edge overlap with said first space when said tool body is rotated around the rotation axis; and a second space is provided between said second outer peripheral cutting edge and said fourth outer peripheral cutting edge, said second space being oriented such that a rotation path of at least one of said first outer peripheral cutting edge and said third outer peripheral cutting edge overlap with said second space when said tool body is rotated around the rotation axis.

11. A cutting tool comprising:

a tool body having a distal end; and a first tip mounted to the distal end of the tool body, said first tip comprising a substantially planar plate including a first edge corner having a corner angle of less than 90°, and an adjacent second edge corner having a corner angle of less than 90°, wherein at least one of the first edge corner and the second edge corner is arranged along an outer periphery of the distal end of the tool body, and wherein the plate includes at least one edge corner having a corner angle of greater than 90°, wherein:

said first edge corner is defined by a first cutting edge and a second cutting edge;

said first cutting edge includes a main cutting tooth portion and a sub-cutting tooth portion;

said sub-cutting tooth portion is provided adjacent a joint between said first cutting edge and said second cutting edge;

said sub-cutting tooth portion is slightly inclined with respect to main cutting tooth portion; and wherein said corner angle of said first edge corner is defined as an angle between said main cutting tooth portion of said first cutting edge and said second cutting edge.

12. A cutting tool comprising:

a tool body having a distal end; and a plurality of tips mounted to the distal end of the tool body, each tip of the plurality of tips comprising a plate of substantially quadrilateral shape, the plate having a first corner having a corner angle of less than 90° and a second corner having a corner angle of less than 90°, wherein at least one of the first corner and the second corner is arranged to project along an outer periphery of the distal end of the tool body, wherein:

each tip of the plurality of tips has two opposing cutting edges defined as long cutting edges and another two opposing cutting edges defined as short cutting edges;

one of the long cutting edges in a first of the plurality of tips projecting towards the distal end of the tool body is defined as a first front peripheral cutting edge and one of the short cutting edges in the first of the plurality of tips is defined as a first outer peripheral cutting edge; and one of the short cutting edges in a second of the plurality of tips projecting towards the distal end of the tool body is defined as a second front peripheral cutting edge and one of the long cutting edges in the second of the plurality of tips is defined as a second outer peripheral cutting edge.

* * * * *